United States Patent
Fliearman et al.

(10) Patent No.: US 10,920,733 B2
(45) Date of Patent: Feb. 16, 2021

(54) MULTI-MODE INTEGRATED STARTER-GENERATOR DEVICE WITH PRELOADED CLUTCH

(71) Applicant: Deere & Company, Moline, IL (US)

(72) Inventors: Steven R. Fliearman, Coffeyville, KS (US); Lisa R. Lloyd, Independence, KS (US); Jeffrey S. Turner, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/385,892

(22) Filed: Apr. 16, 2019

(65) Prior Publication Data
US 2020/0332757 A1    Oct. 22, 2020

(51) Int. Cl.
*F02N 15/04*     (2006.01)
*F02N 11/04*     (2006.01)
(Continued)

(52) U.S. Cl.
CPC .............. *F02N 15/046* (2013.01); *B60K 6/26* (2013.01); *B60K 6/485* (2013.01); *F02N 11/04* (2013.01);
(Continued)

(58) Field of Classification Search
CPC ......... F02N 15/046; F02N 11/04; B60K 6/26; B60K 6/485; B60K 2006/268; F16H 3/66;
(Continued)

(56) References Cited

U.S. PATENT DOCUMENTS 3,062,073 A    11/1962   Brass
3,081,759 A     3/1963   Mauck et al.
(Continued)

FOREIGN PATENT DOCUMENTS

DE    69218975 T2    6/1994
DE    19745995 A1    9/1998
(Continued)

OTHER PUBLICATIONS

Harmonic Drive LLC, Harmonic Planetary Precision Gearing & Motion Control, Product Brochure, Mar. 2006.
(Continued)

*Primary Examiner* — Dirk Wright
(74) *Attorney, Agent, or Firm* — Klintworth & Rozenblat IP LLP

(57) ABSTRACT

A combination starter-generator device includes an electric machine and a gear set configured to receive rotational input from the electric machine and from the engine and to couple the electric machine and the engine in a first power flow direction and a second power flow direction. The gear set is configured to operate in one of multiple gear ratios in the first power flow direction and at least one gear ratio in the second power flow direction. The starter-generator device further includes a clutch arrangement with at least one active clutch selectively coupled to the gear set to effect the gear ratios in the first power flow direction and in the second power flow direction. The clutch arrangement further includes at least one drag clutch to apply a drag force on the gear set to slow the electric machine.

20 Claims, 13 Drawing Sheets

(51) Int. Cl.
  *B60K 6/26* (2007.10)
  *F16H 3/66* (2006.01)
  *B60K 6/485* (2007.10)

(52) U.S. Cl.
  CPC .......... *F16H 3/66* (2013.01); *B60K 2006/268* (2013.01); *B60Y 2200/92* (2013.01); *F16H 2200/0039* (2013.01); *F16H 2200/2007* (2013.01); *F16H 2200/2064* (2013.01); *F16H 2200/2094* (2013.01)

(58) Field of Classification Search
  CPC ..... F16H 2200/0039; F16H 2200/2064; F16H 2200/2094; F16H 2200/2007; B60Y 2200/92
  USPC .......................................................... 475/303
  See application file for complete search history.

(56) References Cited

U.S. PATENT DOCUMENTS

| | | |
|---|---|---|
| 3,150,544 A | 9/1964 | Brass |
| 3,640,152 A | 2/1972 | Shirai et al. |
| 3,675,511 A | 7/1972 | Wakamatsu et al. |
| 3,942,024 A | 3/1976 | Ingham |
| 4,122,354 A | 10/1978 | Howland |
| 4,213,299 A | 7/1980 | Sharar |
| 4,473,752 A | 9/1984 | Cronin |
| 4,484,495 A | 11/1984 | Mason |
| 4,631,455 A | 12/1986 | Taishoff |
| 4,708,030 A * | 11/1987 | Cordner .................. F02C 7/268 192/3.52 |
| 4,750,384 A | 6/1988 | Belliveau |
| 4,862,009 A | 8/1989 | King |
| 4,926,713 A | 5/1990 | Madill |
| 5,033,994 A | 7/1991 | Wu |
| 5,177,968 A | 1/1993 | Fellows |
| 5,418,400 A * | 5/1995 | Stockton .................. F02N 11/04 290/22 |
| 5,558,173 A | 9/1996 | Sherman |
| 5,856,709 A | 1/1999 | Ibaraki et al. |
| 6,371,877 B1 | 4/2002 | Schroeder et al. |
| 6,378,479 B1 | 4/2002 | Nishidate et al. |
| RE37,743 E | 6/2002 | Yang |
| 6,409,622 B1 * | 6/2002 | Bolz ........................ F02N 11/04 475/290 |
| 6,484,596 B2 | 11/2002 | Puchas |
| 6,569,054 B2 | 5/2003 | Kato |
| 6,582,333 B2 | 6/2003 | Man |
| 6,661,109 B2 | 12/2003 | Fukasaku et al. |
| 6,746,354 B1 | 6/2004 | Ziemer |
| 6,770,005 B2 | 8/2004 | Aikawa et al. |
| 6,832,970 B2 | 12/2004 | Eibler |
| 6,852,063 B2 * | 2/2005 | Takahashi ............. F02N 11/003 477/5 |
| 6,910,453 B2 * | 6/2005 | Sugino .................... F02N 11/04 123/179.28 |
| 6,965,173 B2 | 11/2005 | Fukasaku et al. |
| 7,028,794 B2 | 4/2006 | Odahara et al. |
| 7,044,255 B2 | 5/2006 | Maeda et al. |
| 7,086,978 B2 | 8/2006 | Aikawa et al. |
| 7,117,965 B2 | 10/2006 | Yatabe et al. |
| 7,223,191 B2 | 5/2007 | Aikawa et al. |
| 7,374,031 B2 | 5/2008 | Skorucak |
| 7,387,043 B2 | 6/2008 | Sakamoto et al. |
| 7,503,871 B2 | 3/2009 | Kozarekar et al. |
| 7,582,033 B2 | 9/2009 | Kefti-Cherif et al. |
| 7,753,147 B2 | 7/2010 | Usoro |
| 7,780,562 B2 | 8/2010 | King et al. |
| 8,143,735 B2 | 3/2012 | Bauer |
| 8,226,517 B2 | 7/2012 | Tsai et al. |
| 8,235,859 B2 | 8/2012 | Yun |
| 8,480,529 B2 | 7/2013 | Pohl et al. |
| 8,500,601 B2 * | 8/2013 | Arnold .................. F16H 61/0403 477/154 |
| 8,584,359 B1 | 11/2013 | Bowman |
| 8,727,944 B2 | 5/2014 | Noboru et al. |
| 8,734,281 B2 | 5/2014 | Ai et al. |
| 8,996,227 B2 | 3/2015 | Sisk et al. |
| 9,017,207 B2 | 4/2015 | Pohl et al. |
| 9,074,656 B2 | 7/2015 | Benz et al. |
| 9,145,136 B2 | 9/2015 | Suntharalingam et al. |
| 9,184,646 B2 | 11/2015 | Fulton |
| 9,261,064 B2 | 2/2016 | Patel et al. |
| 9,371,810 B2 | 6/2016 | Creviston |
| 9,421,855 B2 | 8/2016 | Suntharalingam et al. |
| 9,541,172 B1 | 1/2017 | Wright |
| 9,555,795 B2 | 1/2017 | Nefcy et al. |
| 9,676,265 B2 | 6/2017 | Choi |
| 9,726,282 B2 | 8/2017 | Pohl et al. |
| 10,183,569 B2 | 1/2019 | Toyota et al. |
| 10,479,187 B2 | 11/2019 | Lubben et al. |
| 10,518,626 B2 | 12/2019 | Pettersson |
| 10,591,025 B2 | 3/2020 | Fliearman et al. |
| 10,619,711 B2 | 4/2020 | Fliearman et al. |
| 2001/0019210 A1 | 9/2001 | Fukasaku et al. |
| 2001/0025621 A1 | 10/2001 | Shiraishi et al. |
| 2001/0042649 A1 | 11/2001 | Maeda et al. |
| 2002/0019284 A1 | 2/2002 | Aikawa et al. |
| 2002/0033059 A1 | 3/2002 | Pels et al. |
| 2002/0117860 A1 | 8/2002 | Man et al. |
| 2002/0139592 A1 | 10/2002 | Fukasaku et al. |
| 2002/0177504 A1 | 11/2002 | Pels et al. |
| 2003/0001391 A1 | 1/2003 | Kuang et al. |
| 2003/0104900 A1 | 6/2003 | Takahashi |
| 2003/0224888 A1 | 12/2003 | Wilder et al. |
| 2004/0055800 A1 | 3/2004 | Katou et al. |
| 2004/0116226 A1 | 6/2004 | Baker et al. |
| 2006/0111211 A1 | 5/2006 | Kefti-Cherif et al. |
| 2006/0166777 A1 | 7/2006 | Aikawa et al. |
| 2007/0108006 A1 | 5/2007 | Schmid et al. |
| 2007/0157899 A1 | 7/2007 | Seufert et al. |
| 2007/0265126 A1 | 11/2007 | Janson et al. |
| 2008/0179119 A1 | 7/2008 | Grenn et al. |
| 2008/0314195 A1 | 12/2008 | Andoh et al. |
| 2009/0055061 A1 | 2/2009 | Zhu |
| 2009/0176611 A1 | 7/2009 | Avery |
| 2009/0264241 A1 * | 10/2009 | Dittrich .................. F16H 61/702 475/209 |
| 2009/0312145 A1 | 12/2009 | Pohl et al. |
| 2010/0029428 A1 | 2/2010 | Abe et al. |
| 2010/0044183 A1 * | 2/2010 | Guggolz ............... B60W 10/02 192/219 |
| 2010/0048338 A1 | 2/2010 | Si |
| 2010/0063704 A1 | 3/2010 | Okubo et al. |
| 2010/0076634 A1 | 3/2010 | Brigham |
| 2011/0010031 A1 | 1/2011 | Syed et al. |
| 2011/0015020 A1 | 1/2011 | Grosser |
| 2011/0053729 A1 | 3/2011 | Parsons et al. |
| 2011/0070999 A1 | 3/2011 | Soliman et al. |
| 2011/0263379 A1 | 10/2011 | Liang et al. |
| 2012/0103293 A1 | 5/2012 | Robinette et al. |
| 2012/0235473 A1 | 9/2012 | Jiang et al. |
| 2012/0240723 A1 | 9/2012 | Gluckler et al. |
| 2013/0046427 A1 | 2/2013 | Hohenberg |
| 2013/0252773 A1 | 9/2013 | Suntharalingam et al. |
| 2013/0316873 A1 | 11/2013 | Jansen et al. |
| 2014/0011619 A1 | 1/2014 | Pohl et al. |
| 2014/0137824 A1 | 5/2014 | Jacques et al. |
| 2014/0150604 A1 | 6/2014 | Kaltenbach |
| 2014/0256490 A1 | 9/2014 | Honda |
| 2015/0226323 A1 | 8/2015 | Pohl et al. |
| 2015/0239335 A1 | 8/2015 | Wachter et al. |
| 2016/0031438 A1 | 2/2016 | Matsui et al. |
| 2016/0031439 A1 | 2/2016 | Nefcy et al. |
| 2016/0052382 A1 | 2/2016 | Clark et al. |
| 2016/0076629 A1 | 3/2016 | Modrzejewski et al. |
| 2016/0082821 A1 | 3/2016 | Mueller et al. |
| 2016/0096522 A1 | 4/2016 | Ortmann et al. |
| 2016/0137045 A1 | 5/2016 | Zhu et al. |
| 2016/0200311 A1 | 7/2016 | Nefcy et al. |
| 2016/0207525 A1 | 7/2016 | Nefcy et al. |
| 2016/0258495 A1 | 9/2016 | Bird |
| 2016/0288780 A1 | 10/2016 | Shukla et al. |

(56) References Cited

U.S. PATENT DOCUMENTS

| | | | |
|---|---|---|---|
| 2016/0348741 A1 | 12/2016 | Niemiec et al. |
| 2017/0248196 A1 | 8/2017 | Turner et al. |
| 2017/0328470 A1 | 11/2017 | Pohl et al. |
| 2017/0368925 A1 | 12/2017 | Maki |
| 2018/0100564 A1 | 4/2018 | Fliearman et al. |
| 2018/0106365 A1 | 4/2018 | Tsukizaki et al. |
| 2018/0172124 A1 | 6/2018 | Valente et al. |
| 2018/0238443 A1 | 6/2018 | Aulin et al. |
| 2018/0186230 A1 | 7/2018 | Fukuda et al. |
| 2018/0236864 A1 | 8/2018 | Imamura et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1 | 11/2019 | Sato et al. |

FOREIGN PATENT DOCUMENTS

| | | | | |
|---|---|---|---|---|
| DE | 19927521 A1 | 6/2000 | | |
| DE | 19911924 A1 | 9/2000 | | |
| DE | 19923316 A1 | 11/2000 | | |
| DE | 10003741 A1 | 4/2001 | | |
| DE | 19927521 C2 * | 7/2001 | ........... | F02N 15/046 |
| DE | 010007959 A1 | 8/2001 | | |
| DE | 10007959 A1 * | 8/2001 | ............ | F02N 15/06 |
| DE | 102006037576 A1 | 4/2008 | | |
| DE | 102010030570 A1 | 12/2011 | | |
| DE | 102010030571 A1 | 12/2011 | | |
| DE | 102010060140 A1 | 4/2012 | | |
| DE | 102010060140 A1 * | 4/2012 | ........... | F02N 15/046 |
| DE | 102011080068 A1 | 1/2013 | | |
| DE | 102011089708 A1 | 6/2013 | | |
| DE | 102011089709 A1 | 6/2013 | | |
| DE | 102011089710 A1 | 6/2013 | | |
| DE | 112011103973 T5 | 10/2013 | | |
| DE | 102008045202 B4 | 3/2014 | | |
| DE | 102013203009 A1 | 8/2014 | | |
| DE | 102013206970 A1 | 10/2014 | | |
| DE | 102014200720 A1 | 2/2015 | | |
| DE | 102014200723 B3 | 2/2015 | | |
| DE | 102013219948 | 4/2015 | | |
| DE | 102017203026 A1 | 8/2017 | | |
| DE | 102017203026 A1 * | 8/2017 | ............ | F16H 3/003 |
| DE | 102017204269 A1 | 9/2017 | | |
| DE | 102013012747 A1 | 4/2019 | | |
| EP | 0645271 B1 | 3/1995 | | |
| EP | 1069310 A2 | 1/2001 | | |
| EP | 2272702 A2 | 1/2011 | | |
| EP | 2664785 | 11/2013 | | |
| GB | 0650564 | 2/1951 | | |
| JP | 2015116004 A | 6/2015 | | |
| WO | 0188369 A1 | 11/2001 | | |
| WO | WO-0188369 A1 * | 11/2001 | ........... | F02N 15/046 |
| WO | 200700107458 A2 | 9/2007 | | |

OTHER PUBLICATIONS

NTN Automotive Sales Headquarters, Compact Clutch Integrated Pulley for Alternators, NTN Technical Review No. 75, 2007.
North Atalantic Starter, Starter Drives Explained, Northatlan.com, 2005.
Deere & Company, Utility U.S. Appl. No. 15/825,520, filed Nov. 29, 2017.
Ioan-Adrian Viorel et al., Integrated Starter-Generators for Automotive Applications, Technical University of Cluj-Romania, Dept. of Electrical Machines, vol. 45, No. 3, 2004.
German Search Report for application No. 1020182214956 dated May 28, 2019.
German Search Report for application No. 1020172030267 dated Aug. 4, 2017.
Deere & Company, Multi-Mode Integrated Starter-Generator Device, Utility U.S. Appl. No. 16/385,860, filed Apr. 16, 2019.
Deere & Company, Multi-Mode Integrated Starter-Generator Device With Preloaded Clutch, Utility U.S. Appl. No. 16/385,784, filed Apr. 16, 2019.
Deere & Company, Multi-Mode Integrated Starter-Generator Device With Magnetic Cam Assembly, Utility U.S. Appl. No. 16/385,934, filed Apr. 16, 2019.
Deere & Company, Multi-Mode Integrated Starter-Generator Device With Cam Arrangement, Utility U.S. Appl. No. 16/385,964, filed Apr. 16, 2019.
Deere & Company, Multi-Mode Integrated Starter-Generator Device With Dog Clutch Arrangement, Utility U.S. Appl. No. 16/385,989, filed Apr. 16, 2019.
Deere & Company, Multi-Mode Starter-Generator Device Transmission With Single Valve Control, Utility U.S. Appl. No. 16/386,001, filed Apr. 16, 2019.
Deere & Company, Multi-Mode Integrated Starter-Generator Device With Electromagnetic Actuation Assembly, Utility U.S. Appl. No. 16/386,020, filed Apr. 16, 2019.
Deere & Company, Multi-Mode Integrated Starter-Generator Device With Transmission Assembly Mounting Arrangement, Utility U.S. Appl. No. 16/386,052, filed Apr. 16, 2019.
Deere & Company, Multi-Mode Integrated Starter-Generator Device With Solenoid Cam Actuation Apparatus, Utility U.S. Appl. No. 16/386,075, filed Apr. 16, 2019.
USPTO Non-Final Office Action dated Sep. 9, 2019 for Utility U.S. Appl. No. 15/834,356.
USPTO Non-Final Office Action dated Feb. 25, 2019 for Utility U.S. Appl. No. 15/834,356.
USPTO Non-Final Office Action dated Nov. 1, 2018 for Utility U.S. Appl. No. 15/825,520.
USPTO Non-Final Office Action dated Nov. 2, 2017 for Utility U.S. Appl. No. 15/056,767.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 28, 2018 for Utility U.S. Appl. No. 15/056,767.
German Search Report for application No. 1020182189080 dated May 27, 2019.
German Search Report for application No. 1020182180784 dated Jun. 4, 2019.
USPTO Non-Final Office Action dated Mar. 4, 2020 for Utility U.S. Appl. No. 16/385,934.
USPTO Non-Final Office Action dated Jun. 19, 2020 for U.S. Appl. No. 16/386,075.
German Search Report issued in German Application No. 102020204706,5 dated Sep. 3, 2020. (7 pages).
German Search Report issued in German Application No. 102020204795.2 dated Sep. 2, 2020. (7 pages).
German Search Report issued in German Application No. 102020204705.7 dated Sep. 1, 2020. (6 pages).
USPTO Non-Final Office Action dated Aug. 24, 2020 for U.S. Appl. No. 16/385,964.
USPTO Non-Final Office Action dated Aug. 24, 2020 for U.S. Appl. No. 16/385,784.
German Search Report issued in German Application No. 102020204642.5 dated Sep. 4, 2020. (8 pages).
German Search Report issued in German Application No. 102020204646.8 dated Sep. 1, 2020. (7 pages).
German Search Report issued in German Application No. 102020204704.9 dated Sep. 3, 2020. (7 pages).
German Search Report issued in German Application No. 102020203063.4 dated Sep. 4, 2020. (6 pages).
German Search Report issued in German Application No. 10202020463.3 dated Sep. 4, 2020. (7 pages).
USPTO non-final office action issued in pending Utility U.S. Appl. No. 16/386,052 dated Oct. 30, 2020.

(56) References Cited

OTHER PUBLICATIONS

USPTO non-final office action issued in pending Utility U.S. Appl. No. 16/385,860 dated Nov. 4, 2020.

* cited by examiner

MULTI-MODE INTEGRATED STARTER-GENERATOR DEVICE WITH PRELOADED CLUTCH

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle power systems, including arrangements for starting mechanical power equipment and generating electric power therefrom.

BACKGROUND OF THE DISCLOSURE

Work vehicles, such as those used in the agriculture, construction and forestry industries, and other conventional vehicles may be powered by an internal combustion engine (e.g., a diesel engine), although it is becoming more common for mixed power sources (e.g., engines and electric motors) to be employed. In any case, engines remain the primary power sources of work vehicles and require mechanical input from a starter to initiate rotation of the crankshaft and reciprocation of the pistons within the cylinders. Torque demands for starting an engine are high, particularly so for large diesel engines common in heavy-duty machines.

Work vehicles additionally include subsystems that require electric power. To power these subsystems of the work vehicle, a portion of the engine power may be harnessed using an alternator or generator to generate AC or DC power. The battery of the work vehicle is then charged by inverting the current from the alternator. Conventionally, a belt, direct or serpentine, couples an output shaft of the engine to the alternator to generate the AC power. Torque demands for generating current from the running engine are significantly lower than for engine start-up. In order to appropriately transfer power between the engine and battery to both start the engine and generate electric power, a number of different components and devices are typically required, thereby raising issues with respect to size, cost, and complexity.

SUMMARY OF THE DISCLOSURE

This disclosure provides a combined engine starter and electric power generator device with an integral transmission, such as may be used in work vehicles for engine cold start and to generate electric power, thus serving the dual purposes of an engine starter and an alternator with more robust power transmission to and from the engine in both cases.

In one aspect, the disclosure provides a combination starter-generator device is provided for a work vehicle having an engine. The starter-generator device includes an electric machine and a gear set configured to receive rotational input from the electric machine and from the engine and to couple the electric machine and the engine in a first power flow direction and a second power flow direction. The gear set is configured to operate in one of multiple gear ratios in the first power flow direction and at least one gear ratio in the second power flow direction. The starter-generator device further includes a clutch arrangement with at least one active clutch selectively coupled to the gear set to effect the gear ratios in the first power flow direction and in the second power flow direction. The clutch arrangement further includes at least one drag clutch to apply a drag force on the gear set to slow the electric machine.

In another aspect, the disclosure provides a drivetrain assembly is provided for a work vehicle. The drivetrain assembly includes an engine; an electric machine; and a gear set configured to receive rotational input from the electric machine and from the engine and to couple the electric machine and the engine in a first power flow direction and a second power flow direction. The gear set is configured to operate in one of at least a first gear ratio, a second gear ratio, or a third gear ratio in the first power flow direction and at least the third gear ratio in the second power flow direction. The drivetrain assembly further includes a clutch arrangement with at least one active clutch selectively coupled to the gear set to effect the first, second, and third gear ratios in the first power flow direction and the third gear ratio in the second power flow direction. The clutch arrangement further includes at least one drag clutch to apply a drag force on the gear set to slow the electric machine. The drivetrain assembly further includes a cam plate configured to shift the at least one active clutch from a disengaged position in which the at least one active clutch is decoupled from the gear set into an engaged position in which the at least one active clutch is coupled to the gear set.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
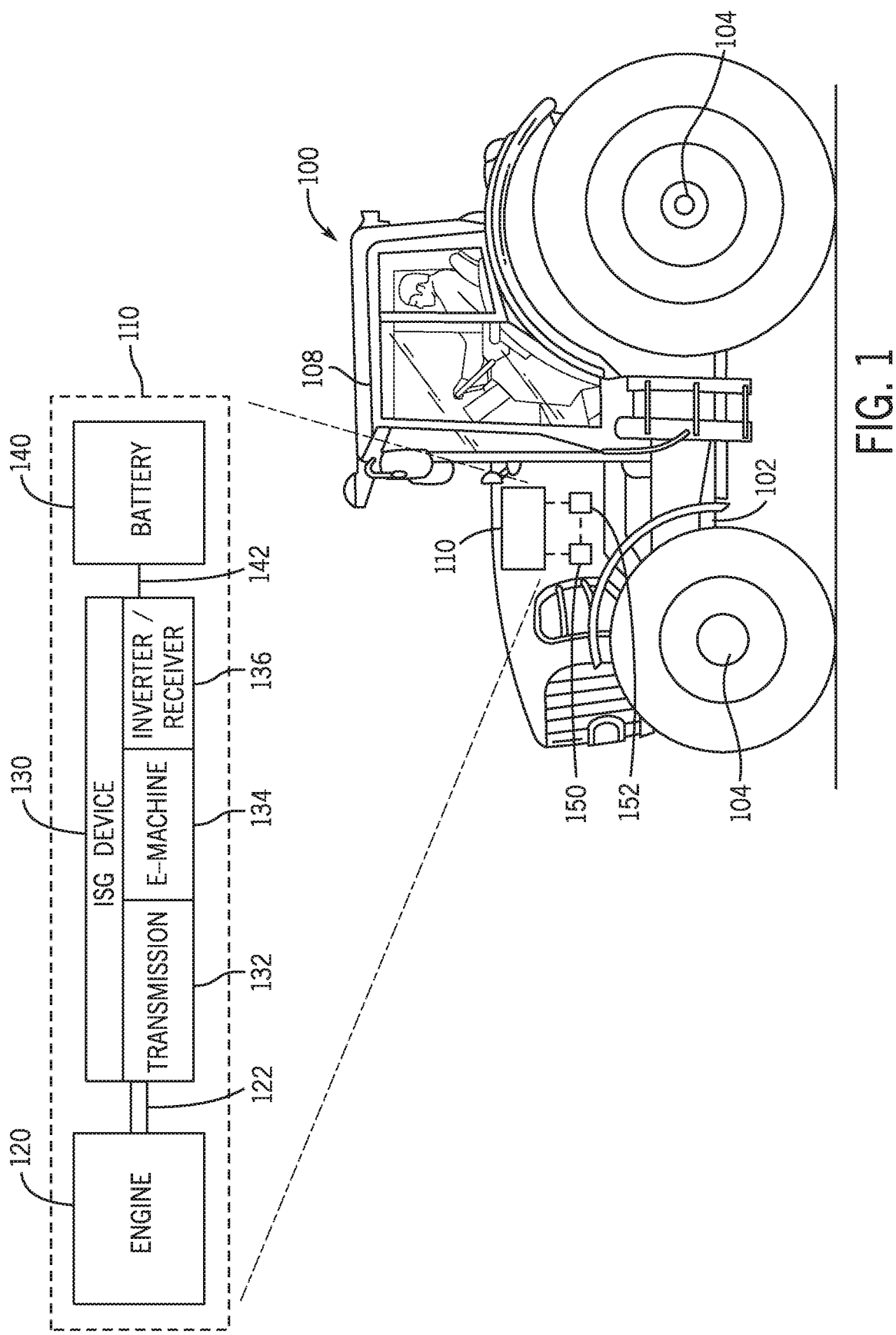
FIG. 1 is a schematic side view of an example work vehicle in the form of an agricultural tractor in which the disclosed integrated starter-generator device may be used.

The following describes one or more example embodiments of the disclosed starter-generator device, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Many conventional vehicle power systems include an internal combustion engine and/or one or more batteries (or other chemical power source) that power various components and subsystems of the vehicle. In certain electric vehicles, a bank of batteries powers the entire vehicle including the drive wheels to impart motion to the vehicle. In hybrid gas and electric vehicles, the motive force may alternate between engine and electric motor power, or the engine power may be supplemented by electric motor power. In still other conventional vehicles, the electric power system is used to initiate engine start up and to run the non-drive electric systems of the vehicle. In the latter case, the vehicle typically has a starter motor that is powered by the vehicle battery to turn the engine crankshaft to move the pistons within the cylinders. In further scenarios, the electric power system may provide a boost to an operating engine.

Some engines (e.g., diesel engines) initiate combustion by compression of the fuel, while other engines rely on a spark generator (e.g., spark plug), which is powered by the battery. Once the engine is operating at a sufficient speed, the power system may harvest the engine power to power the electric system as well as to charge the battery. Typically, this power harvesting is performed with an alternator or other type of power generator. The alternator converts alternating current (AC) power to direct current (DC) power usable by the battery and vehicle electric components by passing the AC power through an inverter (e.g., diode rectifier). Conventional alternators harness power from the engine by coupling a rotor of the alternator to an output shaft of the engine (or a component coupled thereto). Historically this was accomplished by the use of a dedicated belt, but in some more modern vehicles the alternator is one of several devices that are coupled to (and thus powered by) the engine via a single "serpentine" belt.

In certain applications, such as in certain heavy-duty machinery and work vehicles, it may be disadvantageous to have a conventional set-up with separate starter and generator components. Such separate components require separate housings, which may require separate sealing or shielding from the work environment and/or occupy separate positions within the limited space of the engine compartment. Other engine compartment layout complexities may arise as well.

The following describes one or more example implementations of an improved vehicle power system that addresses one or more of these (or other) matters with conventional systems. In one aspect, the disclosed system includes a combination or integrated device that performs the engine cranking function of a starter motor and the electric power generating function of a generator. The device is referred to herein as an integrated starter-generator device ("ISG" or "starter-generator"). This terminology is used herein, at least in some implementations of the system, to be agnostic to the type of power (i.e., AC or DC current) generated by the device. In some implementations, the starter-generator device may function to generate electricity in a manner of what persons of skill in the art may consider a "generator" device that produces DC current directly. However, as used herein, the term "generator" shall mean producing electric power of static or alternating polarity (i.e., AC or DC). Thus, in a special case of the starter-generator device, the electric power generating functionality is akin to that of a conventional alternator, and it generates AC power that is subsequently rectified to DC power, either internally or externally to the starter-generator device.

In certain embodiments, the starter-generator device may include a direct mechanical power coupling to the engine that avoids the use of belts between the engine and the starter-generator device. For example, the starter-generator device may include within its housing a power transmission assembly with a gear set that directly couples to an output shaft of the engine. The gear set may take any of various forms including arrangements with enmeshing spur or other gears as well as arrangements with one or more planetary gear sets. Large gear reduction ratios may be achieved by the transmission assembly such that a single electric machine (i.e., motor or generator) may be used and operated at suitable speeds for one or more types of engine start up, as well as electric power generation. The direct power coupling between the starter-generator device and engine may increase system reliability, cold starting performance, and electric power generation of the system.

Further, in certain embodiments, the starter-generator device may have a power transmission assembly that automatically and/or selectively shifts gear ratios (i.e., shifts between power flow paths having different gear ratios). By way of example, the transmission assembly may include one or more engagement components that engage or disengage automatically or upon command. For example, passive engagement components, such as a one-way clutch (e.g., a roller or sprag clutch), may be used to effect power transmission through a power flow path in the engine start up direction; and active engagement components, such as friction clutch assemblies, may be used to effect power transmission through other power flow paths. In this manner, bi-directional or other clutch (or other) configurations may be employed to carry out the cranking and generating functions with the appropriate control hardware. As a result of the bi-directional nature of the power transmission assembly, the power transfer belt arrangement may be implemented with only a single belt tensioner, thereby providing a relatively compact and simple assembly. In addition to providing torque in two different power flow directions, the gear set may also be configured and arranged to provide power transmission from the electric machine to the engine at one of two different speeds, e.g., according to different gear ratios. The selection of speed may provide additional functionality and flexibility for the power transmission assembly.

In one example, the combination starter-generator may further include a dog clutch arrangement with first, second, and third clutches that are ring-shaped and concentrically arranged, each with clutch teeth that selectively engage the gear set when the respective clutch is repositioned from the disengaged position to the engaged position. The clutches may be supported by a stator plate in between the clutches and the gear set to accept reactive forces, thereby enabling some amount of flexibility of the clutches.

The combination starter-generator further includes a cam plate with cam teeth that may be pivoted to force the clutches into the engaged positions based on the angular position. The cam teeth that engage a respective clutch may be radially and circumferentially offset relative to one another. In some examples, the clutches may include openings to accommodate the cam teeth in the disengaged positions.

In some examples, the combination starter-generator clutch may further include a drag clutch that may be at least partially mounted on the input shaft to slow the electric machine. The drag clutch may be preloaded by a spring to create a predetermined amount of drag force, such as approximately 10 Nm. The drag force functions to facilitate synchronization during speed or direction changes.

Each implementation will be discussed in greater detail below.

Referring to the drawings, an example work vehicle power system as a drivetrain assembly will be described in detail. As will become apparent from the discussion herein, the disclosed system may be used advantageously in a variety of settings and with a variety of machinery. For example, referring now to FIG. 1, the power system (or drivetrain assembly) 110 may be included in a work vehicle 100, which is depicted as an agricultural tractor. It will be understood, however, that other configurations may be possible, including configurations with work vehicle 100 as a different kind of tractor, or as a work vehicle used for other aspects of the agriculture industry or for the construction and forestry industries (e.g., a harvester, a log skidder, a motor grader, and so on). It will further be understood that aspects of the power system 110 may also be used in non-work vehicles and non-vehicle applications (e.g., fixed-location installations).

Briefly, the work vehicle 100 has a main frame or chassis 102 supported by ground-engaging wheels 104, at least the front wheels of which are steerable. The chassis 102 supports the power system (or plant) 110 and an operator cabin 108 in which operator interface and controls (e.g., various joysticks, switches levers, buttons, touchscreens, keyboards, speakers and microphones associated with a speech recognition system) are provided.

As schematically shown, the power system 110 includes an engine 120, an integrated starter-generator device 130, a battery 140, and a controller 150. The engine 120 may be an internal combustion engine or other suitable power source that is suitably coupled to propel the work vehicle 100 via the wheels 104, either autonomously or based on commands from an operator. The battery 140 may represent any one or more suitable energy storage devices that may be used to provide electric power to various systems of the work vehicle 100.

The starter-generator device 130 couples the engine 120 to the battery 140 such that the engine 120 and battery 140 may selectively interact in at least four modes. In a first (or cold engine start) mode, the starter-generator device 130 converts electric power from the battery 140 into mechanical power to drive the engine 120 at a relatively high speed, e.g., during a relatively cold engine start up. In a second (or warm engine start) mode, the starter-generator device 130 converts electric power from the battery 140 into mechanical power to drive the engine 120 at a relatively low speed, e.g., during a relatively warm engine start up. In a third (or boost) mode, the starter-generator device 130 converts electric power from the battery 140 into mechanical power to drive the engine 120 to provide an engine boost. In a fourth (or generation) mode, the starter-generator device 130 converts mechanical power from the engine 120 into electric power to charge the battery 140. Additional details regarding operation of the starter-generator device 130 during the engine start modes, the boost mode, and the generation mode are provided below.

As introduced above, the controller 150 may be considered part of the power system 110 to control various aspects of the work vehicle 100, particularly characteristics of the power system 110. The controller 150 may be a work vehicle electronic controller unit (ECU) or a dedicated controller. In some embodiments, the controller 150 may be configured to receive input commands and to interface with an operator via a human-machine interface or operator interface (not shown) and from various sensors, units, and systems onboard or remote from the work vehicle 100; and in response, the controller 150 generates one or more types of commands for implementation by the power system 110 and/or various systems of work vehicle 100.

Generally, the controller 150 may be configured as computing devices with associated processor devices and memory architectures, as hydraulic, electrical or electro-hydraulic controllers, or otherwise. As such, the controller 150 may be configured to execute various computational and control functionality with respect to the power system 110 (and other machinery). The controller 150 may be in electronic, hydraulic, or other communication with various other systems or devices of the work vehicle 100. For example, the controller 150 may be in electronic or hydraulic communication with various actuators, sensors, and other devices within (or outside of) the work vehicle 100, including various devices associated with the power system 110. Generally, the controller 150 generates the command signals based on operator input, operational conditions, and routines and/or schedules stored in the memory. For example, the operator may provide inputs to the controller 150 via an operator input device that dictates the appropriate mode, or that at least partially defines the operating conditions in which the appropriate mode is selected by the controller 150. In some examples, the controller 150 may additionally or alternatively operate autonomously without input from a human operator. The controller 150 may communicate with other systems or devices (including other controllers) in various known ways, including via a CAN bus (not shown), via wireless or hydraulic communication means, or otherwise.

Additionally, power system 110 and/or work vehicle 100 may include a hydraulic system 152 with one or more electro-hydraulic control valves (e.g., solenoid valves) that facilitate hydraulic control of various vehicle systems, particularly aspects of the starter-generator device 130. The hydraulic system 152 may further include various pumps, lines, hoses, conduits, tanks, and the like. The hydraulic system 152 may be electrically activated and controlled according to signals from the controller 150. In one example and as discussed in greater detail below, the hydraulic system 152 may be utilized to engage and/or disengage clutches within the starter-generator device 130, e.g., by applying and releasing hydraulic pressure based on signals from the controller 150 for one or more clutch actuators. Other mechanisms for controlling such clutches may also be provided.

In one example, the starter-generator device 130 includes a power transmission assembly (or transmission) 132, an electric machine or motor 134, and an inverter/rectifier device 136, each of which may be operated according to command signals from the controller 150. The power transmission assembly 132 enables the starter-generator device 130 to interface with the engine 120, particularly via a crank shaft (or an auxiliary drive shaft or other engine power transfer element) 122 of the engine 120. The power transmission assembly 132 may include one or more gear sets in various configurations to provide suitable power flows and gear reductions, as described below. The power transmission assembly 132 variably interfaces with the electric machine 134 in two different power flow directions such that the electric machine 134 operates as a motor during the engine start and boost modes and as a generator during the generation mode. In one example, discussed below, the power transmission assembly 132 is coupled to the electric machine 134 via a power transfer belt arrangement. This arrangement, along with the multiple gear ratios provided by the power transmission assembly 132, permits the electric machine 134 to operate within optimal speed and torque ranges in both power flow directions. The inverter/rectifier device 136 enables the starter-generator device 130 to interface with the battery 140, such as via direct hardwiring or a vehicle power bus 142. In one example, the inverter/rectifier device 136 inverts DC power from the battery 140 into AC power during the engine start modes and rectifies AC power to DC power in the generation mode. In some embodiments, the inverter/rectifier device 136 may be a separate component instead of being incorporated into the starter-generator device 130. Although not shown, the power system 110 may also include a suitable voltage regulator, either incorporated into the starter-generator device 130 or as a separate component.

Figure 2:
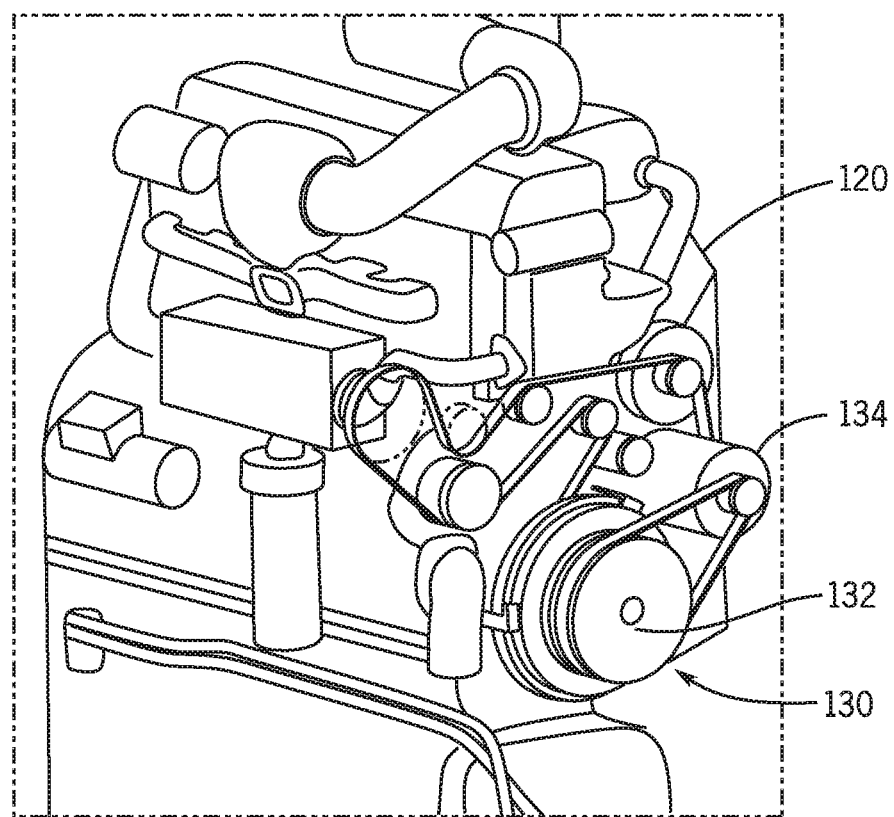
FIG. 2 is a simplified partial isometric view of an engine of the work vehicle of FIG. 1 showing an example mounting location for an example starter-generator device.

Reference is briefly made to FIG. 2, which depicts a simplified partial isometric view of an example mounting location of the starter-generator device 130 relative to the engine 120. In this example, the integrated starter-generator device 130 mounts directly and compactly to the engine 120 so as not to project significantly from the engine 120 (and thereby enlarge the engine compartment space envelope) or interfere with various plumbing lines and access points (e.g., oil tubes and fill opening and the like). Notably, the starter-generator device 130 may generally be mounted on or near the engine 120 in a location suitable for coupling to an engine power transfer element (e.g., crank shaft 122 as introduced in FIG. 1).

Figure 3:
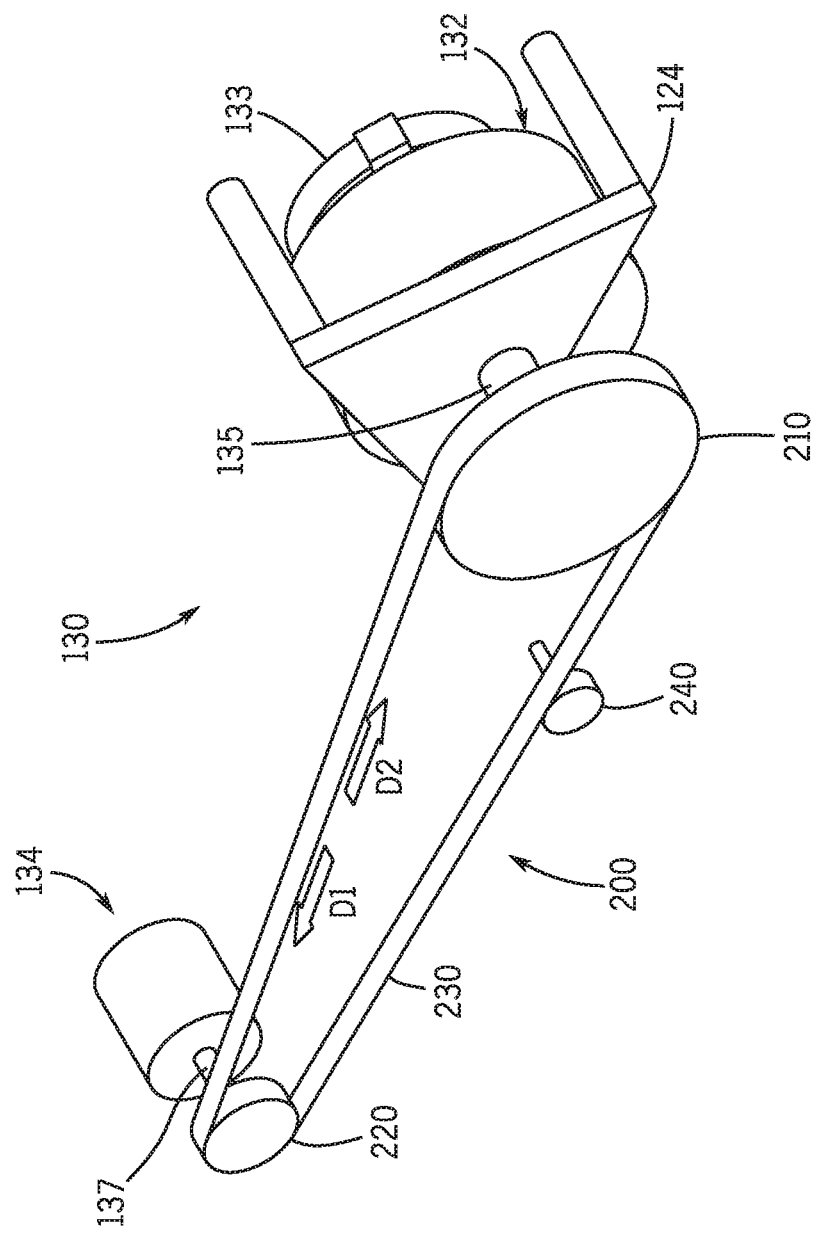
FIG. 3 is a schematic diagram of a portion of a power transfer arrangement of the work vehicle of FIG. 1 having an example starter-generator device.

Reference is additionally made to FIG. 3, which is a simplified schematic diagram of a power transfer belt arrangement 200 between the power transmission assembly 132 and electric machine 134 of the starter-generator device 130. It should be noted that FIGS. 2 and 3 depict one example physical integration or layout configuration of the starter-generator device 130. Other arrangements may be provided.

The power transmission assembly 132 is mounted to the engine 120 and may be supported by a reaction plate 124. As shown, the power transmission assembly 132 includes a first power transfer element 133 that is rotatably coupled to a suitable drive element of the engine 120 (e.g., crank shaft 122 of FIG. 1) and a second power transfer element 135 in the form of a shaft extending on an opposite side of the power transmission assembly 132 from the first power transfer element 133. Similarly, the electric machine 134 is mounted on the engine 120 and includes a further power transfer element 137.

The power transfer belt arrangement 200 includes a first pulley 210 arranged on the second power transfer element 135 of the power transmission assembly 132, a second pulley 220 arranged on the power transfer element 137 of the electric machine 134, and a belt 230 that rotatably couples the first pulley 210 to the second pulley 220 for collective rotation. As described in greater detail below, during the engine start modes, the electric machine 134 pulls the belt 230 to rotate pullies 210, 220 in a first clock direction D1 to drive the power transmission assembly 132 (and thus the engine 120); during the boost mode, the electric machine 134 pulls the belt 230 to rotate pullies 210, 220 in a second clock direction D2 to drive the power transmission assembly 132 (and thus the engine 120); and during the generation mode, the power transmission assembly 132 enables the engine 120 to pull the belt 230 and rotate pullies 210, 220 in the second clock direction D2 to drive the electric machine 134.

As a result of the bi-directional configuration, the power transfer belt arrangement 200 may include only a single belt tensioner 240 to apply tension to a single side of the belt 230 in both directions D1, D2. Using a single belt tensioner 240 to tension the belt 230 is advantageous in that it reduces parts and complexity in comparison to a design that requires multiple belt tensioners. As described below, the bi-directional configuration and associated simplified power transfer belt arrangement 200 are enabled by the bi-directional nature of the gear set in the power transmission assembly 132. Additionally, a difference in the circumferences of the first and second pullies 210, 220 provides a change in the gear ratio between the power transmission assembly 132 and the electric machine 134. In one example, the power transfer belt arrangement 200 may provide a gear ratio of between 3:1-5:1, particularly a 4:1 ratio.

Figure 4:
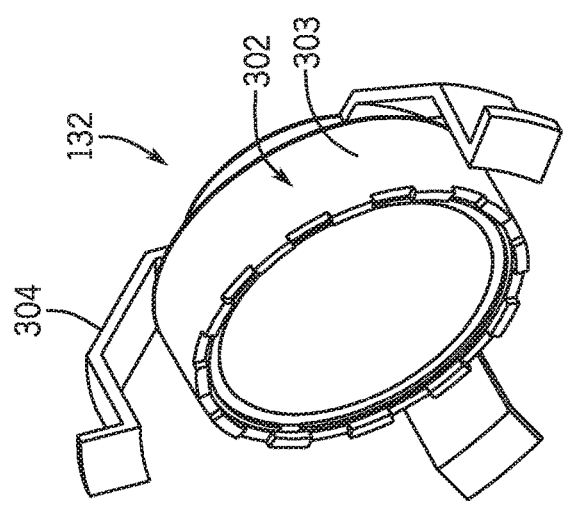
FIG. 4 is an end isometric view of a power transmission assembly of the example starter-generator device that may be implemented in the work vehicle of FIG. 1.

In one example, FIG. 4 depicts an engine-side isometric view of the power transmission assembly 132 that may be implemented into the starter-generator device 130. As shown, the power transmission assembly 132 includes a housing 302 with a rotatable housing element 303 that, in this example, functions as a power transfer element of the assembly 132 and engages a corresponding power transfer element (e.g., crank shaft 122) of the engine 120. A stationary housing mount 304 supports the housing 302 on the engine 120 (not shown in FIG. 4). In this example, the housing mount 304 includes three support legs with first ends that extend from the side of the housing 302 opposite the engine 120 and second ends that mount to the engine 120 (not shown in FIG. 4).

Figure 5:
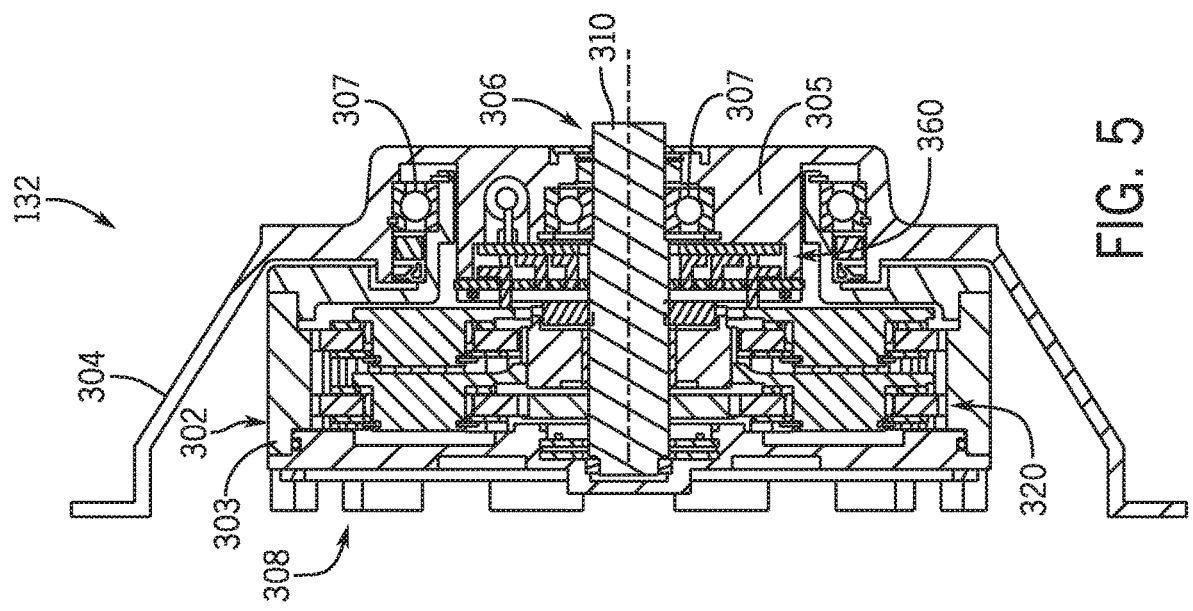
FIG. 5 is a cross-sectional view of a power transmission assembly of the example starter-generator device that may be implemented in the work vehicle of FIG. 1.

The power transmission assembly 132 is additionally depicted in the cross-sectional view of FIG. 5. As shown, the power transmission assembly 132 may be considered to be a unit with the annular housing 302 configured to house various components of the power transmission assembly 132. In the view of FIG. 5, a first side 306 of the power transmission assembly 132 is oriented towards the electric machine 134, and a second side 308 of the power transmission assembly 132 is oriented towards the engine 120. As shown, the housing 302 further includes a stationary housing element 305 positioned in between the rotatable housing element 303 and the housing mount 304. The housing mount 304 and stationary housing element 305 are positioned relative to the rotatable housing element 303 on bearings 307 that enable the relative rotation during operation.

At the first side 306, the power transmission assembly 132 includes an input shaft 310 that is coupled to the electric machine 134 (e.g., via the power transfer belt arrangement 200). In some examples, the input shaft 310 may be directly connected to the power transfer element 135 described above with reference to FIGS. 1 and 2; and in further examples, the input shaft 310 may be coupled through intermediate components, such as a flange or boss. It should be noted that, although the shaft 310 is described as an "input" shaft, it may transfer power both into and out of the power transmission assembly 132, depending on the mode, as described below. The input shaft 310 generally extends through the power transmission assembly 132 to define a primary axis of rotation 300.

The power transmission assembly 132 generally includes a planetary gear set 320. As described below, the planetary gear set 320 is a two stage planetary gear set and generally enables the power transmission assembly 132 to interface with the electric machine 134 (e.g., via the power transfer belt arrangement 200) and the engine 120 (e.g., via direct coupling to the crank shaft 122 of the engine 120). In some embodiments, the input shaft 310 may be considered part of the planetary gear set 320. Although one example configuration of the planetary gear set 320 is described below, other embodiments may have different configurations.

Figure 6:
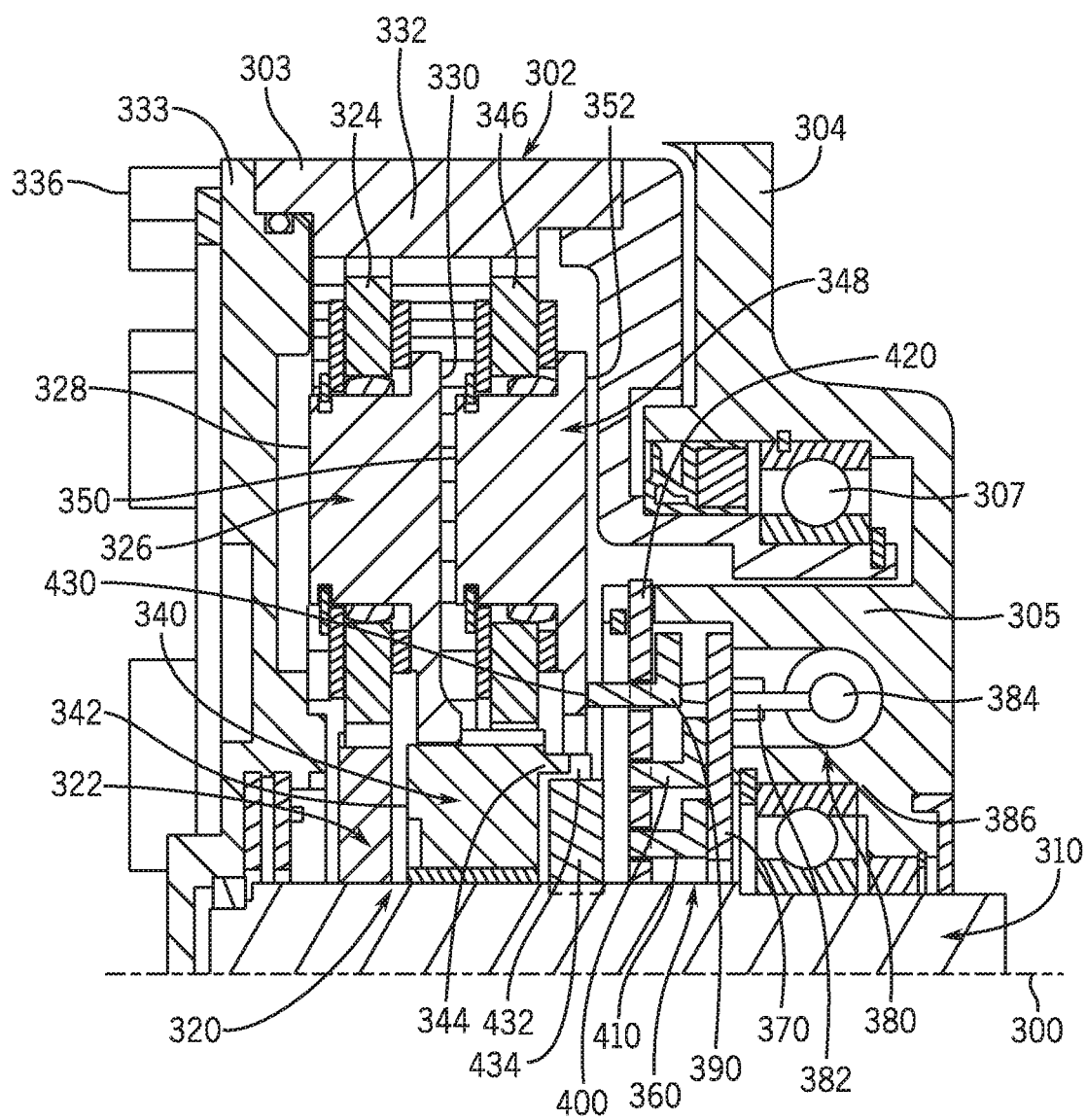
FIG. 6 is a more detailed view of a portion of the power transmission assembly of FIG. 5 for the example starter-generator device.

Reference is additionally made to FIG. 6, which is a closer view of a portion of FIG. 5. The planetary gear set 320 includes a first-stage sun gear 322 mounted for rotation on the input shaft 310. The first-stage sun gear 322 includes a plurality of teeth or splines that mesh with a set of first-stage planet gears 324 that circumscribe the first-stage sun gear 322. In one example, the first-stage planet gears 324 include a single circumferential row of one or more planet gears, although other embodiments may include radially stacked rows, each with an odd number of planet gears.

The first-stage planet gears 324 are supported by a first-stage planet carrier 326, which circumscribes the first-stage sun gear 322, as well as the input shaft 310, and is at least partially formed by first and second radially extending, axially facing carrier plates 328, 330. The first-stage carrier plates 328, 330 include a row of mounting locations for receiving axles extending through and supporting the first-stage planet gears 324 for rotation. As such, in this arrangement, each of the planet axles respectively forms an individual axis of rotation for each of the first-stage planet gears 324, and the first-stage planet carrier 326 enables the set of first-stage planet gears 324 to collectively rotate about the first-stage sun gear 322.

The gear set 320 further includes a ring gear 332 that circumscribes the first-stage sun gear 322 and the first-stage planet gears 324. The ring gear 332 includes radially interior teeth that engage the teeth of the first-stage planet gears 324. As such, first-stage planet gears 324 extend between, and engage with, the first-stage sun gear 322 and the ring gear 332. In some embodiments, a ring gear cover 333 may be mounted within the interior of the ring gear 332 The ring gear cover 333 functions to at least partially enclose the gear set 320 within the housing 302.

In effect, the ring gear 332 is integral with the rotatable housing element 303, which as noted above is positioned on bearings 307 to rotate relative to the stationary housing mount 304. With respect to the planetary gear set 320, the ring gear 332 may function as the power transfer element 133 relative to the engine 120. In particular, the ring gear 332 includes a number of castellations 336 that extend axially about the circumference of the axial face that faces the engine 120. The castellations 336 engage and rotatably fix the ring gear 332 to the crank shaft 122 of the engine 120. The ring gear 332 may be considered an output element of the power transmission assembly 132; however, similar to the input shaft 310, the ring gear 332 may receive rotational input in both power flow directions.

The gear set 320 further includes a second-stage sun gear 340 that is generally hollow and cylindrical, extending between first and second ends 342, 344, and circumscribing the input shaft 310. The first-stage planet carrier 326 has a splined engagement with, or is otherwise fixed to, the second-stage sun gear 340 proximate to the first end 342. Additionally, the second-stage sun gear 340 may include a series of splines that mesh with a set of second-stage planet gears 346. The second-stage planet gears 346 are supported by a second-stage planet carrier 348 formed by first and second planet carrier plates 350, 352. The second-stage planet gears 346 are positioned to additionally engage with the ring gear 332. The second-stage planet gears 346 each have an axle that extends between the two carrier plates 350, 352 that enable each planet gear 346 to rotate relative to the planet carrier 348 about the respective axle. As such, the second-stage planet gears 346 are positioned in between, and engage with each of, the second-stage sun gear 340 and the ring gear 332. In some examples, each second-stage planet gear 346 has a different number of teeth than each corresponding first-stage planet gear 324, while in other examples, each second-stage planet gear 346 has the same number of teeth as each corresponding first-stage planet gear 328.

As will now be described in greater detail, the power transmission assembly 132 additionally includes a clutch arrangement 360 configured to selectively engage and disengage various components of the planetary gear set 320 to modify the power flow through the power transmission assembly 132.

Generally, the clutch arrangement 360 includes a cam actuator or plate 370, an actuator assembly 380, a first (or low) clutch 390, a second (or mid) clutch 400, a third (or high) clutch 410, and a stator plate 420. As described below, each clutch 390, 400, 410 may be shifted between an engaged position and a disengaged position. As such, the clutches 390, 400, 410 may be considered "shifting" clutches that are actively actuated to modify power flow within the power transmission assembly 132.

In one example, the actuator assembly 380 operates to pivot the cam plate 370, which in turn, selectively moves the clutches 390, 400, 410 with support of the stator plate 420 into engagement with the gear set 320 from the disengaged positions to the engaged positions. Although not shown, one or more springs may be provided to maintain the position of the clutches 390, 400, 410 when not in engaged positions and/or return the clutches 390, 400, 410 to the disengaged positions upon subsequent repositioning of the cam plate 370. For example, a first spring (not shown) is positioned in between the low clutch 390 and the stator plate 420, a second spring (not shown) is positioned in between the mid clutch 400 and the stator plate 420, and a third spring (not shown) is positioned in between the high clutch 410 and the stator plate 420 to bias the clutches 390, 400, 410 away from the stator plate 420 in the disengaged positions. In effect, each of the clutches 390, 400, 410 operates as a "cam actuated, spring released" arrangement. In some examples, the clutch arrangement 360 may further include a drag clutch 440 that also impacts the power flow through the power transmission assembly 132. As described in greater detail below after a discussion of the other aspects of the clutch arrangement 360, the drag clutch 440 may be considered a passive clutch.

As schematically shown, the gear set 320 includes a number of engagement elements 430, 432, 434 that enable interaction between various components of the gear set 320 and the clutches 390, 400, 410. Generally, the engagement elements 430, 432, 434 are configured as slots, locks, or pockets that interact with the clutches 390, 400, 410, as described below. In some examples, one or more of the engagement elements 430, 432, 434 may be bi-directional with two angled walls or two perpendicular walls, or one or more of the engagement elements 430, 432, 434 may be designed having a single orientation, e.g., having an angled wall opposing a perpendicular wall.

The first engagement elements 430 may be in the form of one or more slots or locks on the second-stage planet carrier 348. The first engagement elements 430 operate to receive a portion of the low clutch 390, as discussed below, to lock the second-stage planet carrier 348 to a stationary housing element 305, i.e., to ground the second-stage planet carrier 348 and prevent rotation.

The second engagement elements 432 may be in the form of one or more slots or locks on the second-stage sun gear 340. The second engagement elements 432 operate to receive a portion of the mid clutch 400, as discussed below, to lock the second-stage sun gear 340 to the stationary housing element 305, i.e., to ground the second-stage sun gear 340 and prevent rotation.

The third engagement elements 434 are configured to selectively couple and decouple the first-stage sun gear 322 and to the second-stage sun gear 340 via the input shaft 310. In one example, the third engagement elements 434 include one or more shifting or sliding elements that are repositionable between a first position that enables independent rotation of the second-stage sun gear 340 relative to the input shaft 310 (which is rotationally coupled to the first-stage sun gear 322) and a second position that connects the second-stage sun gear 340 for mutual rotation with the input shaft 310 (and thus the first-stage sun gear 322). As discussed in greater detail below, actuation of the high clutch 410 into the engaged position shifts the third engagement elements 434 into the second position such that the second-stage sun gear 340 is locked to the first-stage sun gear 322 via the input shaft 310. As the high clutch 410 is returned to the disengaged position, the third engagement elements 434 are returned to the first position (e.g., with a spring) such that the second-stage sun gear 340 is decoupled from the first-stage sun gear 322 and the input shaft 310.

Figure 7:
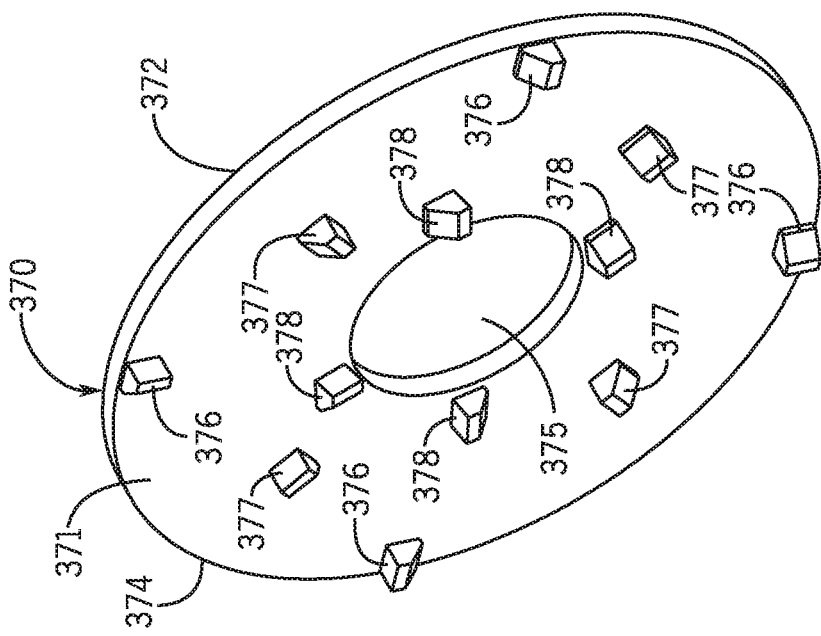
FIG. 7 is an isometric view of a cam plate that may be incorporated into the power transmission assembly of FIG. 5 for the example starter-generator device.

Reference is briefly made to FIG. 7, which is an isometric view of the cam plate 370 removed from the power transmission assembly 132. As shown, the cam plate 370 is generally disc or ring shaped, with a first face 371 and second face 372 that define an outer circumference 374 and an center mounting aperture 375. The cam plate 370 is mounted within the power transfer assembly 132 and configured to pivot through an appropriate range, e.g., approximately 30°, about an axis coaxial to the primary axis of rotation 300. The cam plate 370 includes a series of cam teeth 376, 377, 378 at designated circumferential and radial positions to selectively interact with the clutches 390, 400, 410 in the axial direction, depending on the angular position of the cam plate 370. In this example, the cam teeth 376, 377, 378 include a first row of cam teeth 376 in a first circumferential row at a common radial distance that interact with the low clutch 390; a second row of cam teeth 377 in a second circumferential row at a common radial distance that interact with the mid clutch 400; and in a third circumferential row at a common radial distance that interact with the high clutch 410. As shown, the rows of cam teeth 376, 377, 378 have individual circumferential positions relative to the other rows of teeth 376, 377, 378. In other words, the cam teeth 376, 377, 378 in individual rows are radially offset from the cam teeth 376, 377, 378 of other rows. In this manner, the cam plate 370 may be positioned to selectively engage individual clutches 390, 400, 410, as described in greater detail below. In some examples, each tooth 376, 377, 378 may have a shape that facilitates engagement and disengagement with the respective clutches 390, 400, 410. For example, each tooth 376, 377, 378 may have one angled side and one generally perpendicular side relative to the face 371 of the cam plate 370. The angled side provides a smoother movement, particularly during disengagement. Moreover, each of the cam teeth 376, 377, 378 may have a relatively flat top surface that provides a greater surface for engagement with the clutches 390, 400, 410, described below.

Briefly, referring again to FIG. 6, the cam plate 370 may be pivoted by the actuator assembly 380. In one example, the actuator assembly 380 includes a flange 382 extending from the second face 372 of the cam plate 370 and terminating in a piston element 384 that is positioned within a cylinder element 386. The cylinder element 386 of the actuator assembly 380 is arranged in the stationary housing element 305 proximate to the housing mount 304 and is fluidly coupled to a hydraulic circuit (not shown) having a source of hydraulic fluid, control valves, pumps, and the like operatively coupled to the controller 150. By modifying the fluid pressure in the cylinder element 386, the piston element 384 is repositioned, which in turn functions to reposition the cam plate 370. Accordingly, the actuator assembly 380 may be controlled by modifying the fluid pressure in the cylinder element 386 via the hydraulic circuit based on commands from the controller 150. In this manner, the controller 150 may command the position of the cam plate 370 to implement the desired mode of operation. Other types of actuator assemblies may be provided to reposition the cam plate 370, including linear actuators.

Figure 8:
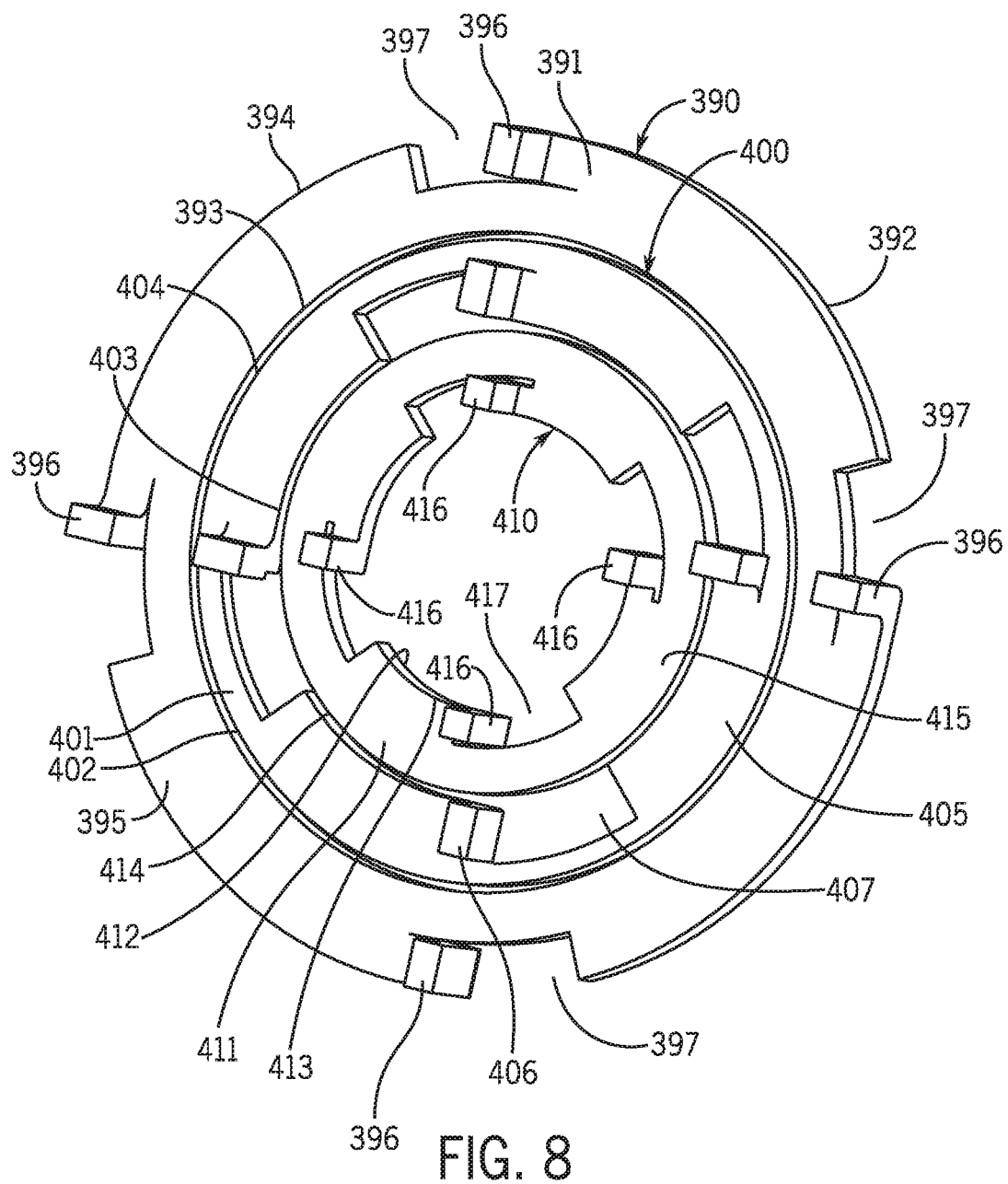
FIG. 8 is an isometric view of clutches that may be incorporated into the power transmission assembly of FIG. 5 for the example starter-generator device.

Reference is now made to FIG. 8, which is an isometric view of the clutches 390, 400, 410 removed from the power transmission assembly 132. In one example, the clutches 390, 400, 410 may be considered "dog" type clutches. As shown, the clutches 390, 400, 410 are generally configured as concentric rings. The low clutch 390 is the largest and is formed by first and second faces 391, 392 and outer and inner circumferences 393, 394 that define a clutch ring base 395. The mid clutch 400 is positioned in between the low clutch 390 and the high clutch 410, and the mid clutch 400 is formed by first and second faces 401, 402 and outer and inner circumferences 403, 404 that define a clutch ring base 405. The high clutch 410 is the smallest, arranged radially inside the mid clutch 400, and is formed by first and second faces 411, 412 and outer and inner circumferences 413, 414 that define a clutch ring base 415. Collectively, the clutches 390, 400, 410 may be mounted on a spindle extending from the stationary housing element 305 and configured to individually move axially but remain stationary in the circumferential and radial dimensions.

Each clutch 390, 400, 410 further defines a series of clutch teeth 396, 406, 416 that extend generally perpendicularly from the respective first clutch face 391, 401, 411 of the ring base 395, 405, 415 and clutch openings 397, 407, 417 of the ring base 395, 405, 415, each circumferentially adjacent a respective one of the clutch teeth 396, 406, 416. In this embodiment, four clutch teeth 396, 406, 416 and four clutch openings 397, 407, 417 are provided for each clutch 390, 400, 410. Other embodiments may have greater or fewer number of teeth and/or openings. The clutch teeth 396, 406, 416 may have a slight ramp or angled shape at the intersection of the respective tooth 396, 406, 416 and base 395, 405, 415 that assists in engagement and disengagement of the clutch 390, 400, 410.

In one embodiment, each of the clutches 390, 400, 410 may be formed from a single plate of material that undergoes stamping to form the clutch teeth 396, 406, 416 and clutch openings 397, 407, 417. As described in greater detail below, the stamping process enables a dog-type clutch 390, 400, 410 in which 1) the clutch teeth 396, 406, 416 are configured to engage the gear set 320; 2) the shape of the teeth 396, 406, 416 provides a ramp that facilitates engagement; 3) the openings 397, 407, 417 enable clearance for the cam plate 370 when disengaged; and 4) the structure of each clutch 390, 400, 410 enables load sharing during operation.

In this example, the clutch teeth 396 and clutch openings 397 of the low clutch 390 are generally radially aligned with corresponding clutch teeth 406 and clutch openings 407 of the mid clutch 400, which in turn are generally radially aligned with corresponding clutch teeth 416 and clutch openings 417 of the high clutch 410. As described below, the clutches 390, 400, 410 are supported such that the clutches 390, 400, 410 may have some amount of flexibility to accommodate relative movement within the power transmission assembly 132.

As noted above, the clutches 390, 400, 410 are generally arranged concentrically and are rotationally stationary. However, each clutch 390, 400, 410 is arranged to shift axially, out of the concentric arrangement, from a disengaged position into an engaged position by the cam plate 370, and subsequently back into the disengaged positions. In the engaged positions, the clutch teeth 396, 406, 416 of the shifted clutch 390, 400, 410 selectively engage the gear set 320. In other words, the cam plate 370 has angular positions in which the cam teeth 376, 377, 378 are accommodated by the clutch openings 397, 407, 417 corresponding to disengaged clutch positions and other angular positions in which the cam teeth 376, 377, 378 contact the respective second face 392, 402, 412 of the selected clutch 390, 400, 410 to force the respective clutch 390, 400, 410 axially into an engaged position such that the corresponding clutch teeth 396, 406, 416 engage with the engagement elements 430, 432, 434 of the gear set 320 to modify power flow. Additional details and examples of operation will be provided below.

Figure 9:
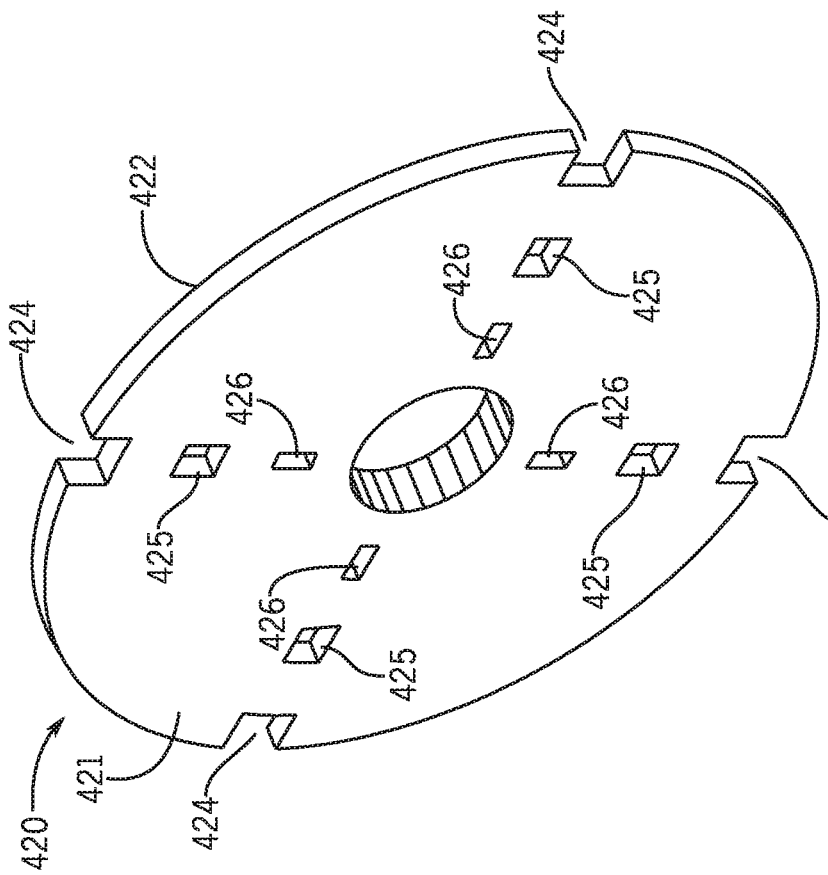
FIG. 9 is an isometric view of a stator plate that may be incorporated into the power transmission assembly of FIG. 5 for the example starter-generator device.

Reference is now made to FIG. 9, which is an isometric view of the stator plate 420 removed from the power transmission assembly 132. The stator plate 420 is generally disc shaped with a first face 421 oriented towards the gear set 320 and a second face 422 oriented towards the clutches 390, 400, 410. The stator plate 420 defines a number of slots 424, 425, 426 in rows at designated radial and circumferential positions. In particular, the stator plate 420 includes a first circumferential row of slots 424 that are positioned to accommodate the clutch teeth 396 of the low clutch 390 when the low clutch 390 is in the engaged position; a second circumferential row of slots 425 that are positioned to accommodate the clutch teeth 406 of the mid clutch 400 when the mid clutch 400 is in the engaged position; and a third circumferential row of slots 426 that are positioned to accommodate the clutch teeth 416 of the high clutch 410 when the high clutch 410 is in the engaged position. During operation, the stator plate 420 is stationary without rotational or axial movement. As described in greater detail below, the stator plate 420 functions to accept the reactive loads resulting from the engagements between the clutches 390, 400, 410 and the engagement elements 430, 432, 434 of the gear set 320. This also enables the clutches 390, 400, 410 to have some amount of flexibility.

As introduced above, the power transmission assembly 132 may be operated to selectively function in one of four different modes, including: a first or low engine start mode in which the power transmission assembly 132 transfers power from the battery 140 to the engine 120 with a first gear ratio; a second or warm engine start mode in which the power transmission assembly 132 transfers power from the battery 140 to the engine 120 with a second gear ratio; a third or boost mode in which the power transmission assembly 132 transfers power from the battery 140 to the engine 120 with a third gear ratio; and a generation mode in which the power transmission assembly 132 transfers power from the engine 120 to the battery 140 in a fourth gear ratio, which in this example is equal to the third gear ratio. Comparatively, the engine start modes are relatively low speed and relatively high torque output, and the boost and generation modes are relatively high speed and relatively low torque output. As such, the power transmission assembly 132 and the power transfer belt arrangement 200 are bi-directional and have different gearing ratios to transfer power in different power flow directions and along different power flow paths, depending on the mode. The power flow paths in the different modes are described below with reference to FIGS. 10-13 in which arrows are provided to schematically represent the flows of power.

Figure 10:
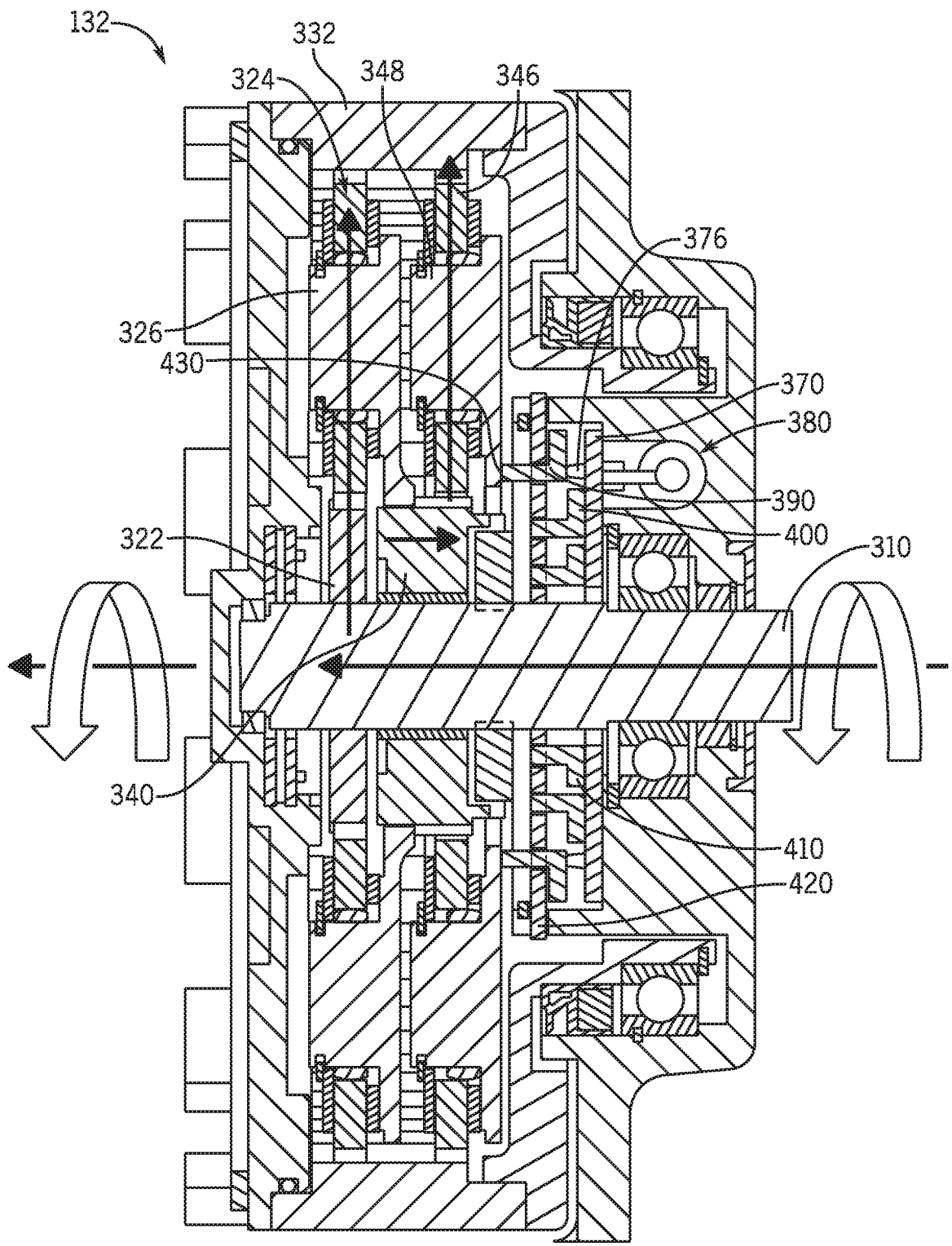
FIG. 10 is a sectional view of the power transmission assembly of FIG. 5 depicting a schematic representation of a power flow path in a first engine start mode of the example starter-generator device.
Figure 14:
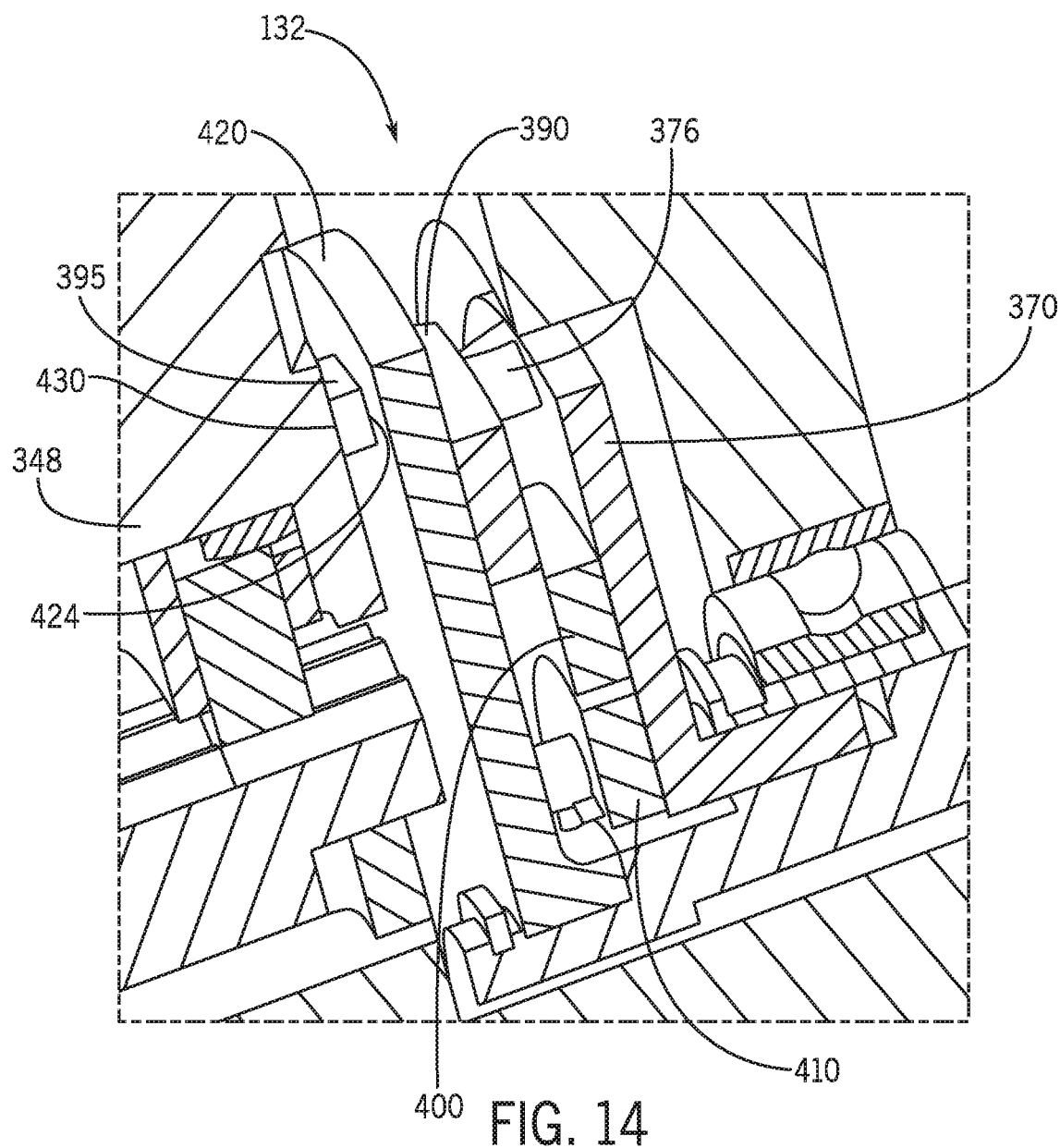
FIG. 14 is a partial sectional view of the power transmission assembly of FIG. 5 in the first engine start mode of the example starter-generator device.

Reference is now made to FIG. 10, which is a depiction of the power transmission assembly 132 in the cold engine start mode, annotated with arrows representing the power flow path. In the discussion below, reference is additionally made to FIGS. 7-9, as well as FIG. 14, which is a sectional view of a portion of the power transmission assembly 132 in the cold engine start mode.

In this example, the actuator assembly 380, commanded by the controller 150, functions to pivot the cam plate 370 into a first angular position. In this position, the first cam teeth 376 of the cam plate 370 engage the second face 392 of the low clutch 390 to move the low clutch 390 into the engaged position. Also in the first angular position, the second cam teeth 377 of the cam plate 370 are accommodated within the openings 407 of the mid clutch 400 and the third cam teeth 378 of the cam plate 370 are accommodated within the openings 417 of the high clutch 410, thereby resulting in the mid clutch 400 and the high clutch 410 remaining in the disengaged positions. Since the first cam teeth 376 of the cam plate 370 engage the second face 392 of the low clutch 390, the low clutch 390 is pressed axially towards the gear set 320. As the low clutch 390 is pressed in this direction, the clutch teeth 396 of the low clutch 390 extend through the first slots 424 in the stator plate 420 and into the first engagement elements 430 on the second-stage planet carrier 348, thereby resulting in the engaged position of the low clutch 390. In the disengaged positions, the clutch teeth 406 of the mid clutch 400 and the clutch teeth 416 of the high clutch 410 may at least partially be positioned within the slots 425, 426 of the stator plate 420, although in some embodiments, the clutch teeth 406, 416 of disengaged clutches 400, 410 may remain completely outside of the stator plate 420.

The positioning of the clutch teeth 396 through the stator plate 420 into the first engagement elements 430 of the second-stage planet carrier 348 functions to ground and prevent rotation of the second-stage planet carrier 348. In this position, the stator plate 420 supports the low clutch 390 by receiving the reaction forces from the second-stage planet carrier 348. The view of FIG. 14 particularly depicts the cam teeth 376 of the cam plate 370 axially shifting the low clutch 390 such that the clutch teeth 396 extend through the slots 424 of the stator plate 420 and into the engagement elements 430 of the second-stage planet carrier 348. Although not visible in FIG. 14, the cam teeth 377, 378 of the cam plate 370 are accommodated by the openings 407, 417 in the mid and high clutches 400, 410 such that these clutches 400, 410 remain disengaged.

As the second-stage planet carrier 348 is grounded, the power transmission assembly 132 may operate in the cold engine start mode. In the cold engine start mode, the engine 120 may be initially inactive, and activation of the ignition by an operator in the cabin 108 of the work vehicle 100 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1. Rotation of the input shaft 310 drives rotation of the first-stage sun gear 322, and in turn, rotation of the first-stage sun gear 322 drives rotation of the first-stage planet gears 324. The first-stage planet gears 324 drive the first-stage planet carrier 326, which as noted above is splined with the second-stage sun gear 340. As a result, the first-stage planet carrier 326 drives the second-stage sun gear 340 and thus the second-stage planet gears 346. As noted above, the second-stage planet carrier 348 is grounded by the low clutch 390. As such, rotation of the first-stage and second-stage planet gears 324, 346 operates to drive the ring gear 332. Since the number of first-stage and second-stage planet gears 324, 346 in the power flow path is an odd number (e.g., 1) in the radial direction, the first-stage and second-stage planet gears 324, 346 drive the ring gear 332 in the opposite direction (e.g., the second clock direction D2) relative to the first-stage and second-stage sun gears 322, 340 rotating in the first clock direction D1. As noted above, the ring gear 332 functions as the power transfer element 133 to interface with the crank shaft 122 of the engine 120 to drive and facilitate engine start. In effect, during the cold engine start mode, the power transmission assembly 132 operates as a sun-in, ring-out configuration.

In one example, the power transmission assembly 132 provides a 15:1 gear ratio in the power flow direction of the cold engine start mode. In other embodiments, other gear ratios (e.g., 10:1-30:1) may be provided. Considering a 4:1 gear ratio from the power transfer belt arrangement 200, a resulting 60:1 gear ratio (e.g., approximately 40:1 to about 120:1) may be achieved for the starter-generator device 130 between the electric machine 134 and the engine 120 during the cold engine start mode. As such, if for example the electric machine 134 is rotating at 10,000 RPM, the crank shaft 122 of the engine 120 rotates at about 100-150 RPM. In one example, the power transmission assembly 132 may deliver a torque of approximately 3000 Nm to the engine 120. Accordingly, the electric machine 134 may thus have normal operating speeds with relatively lower speed and higher torque output for cold engine start up.

Figure 11:
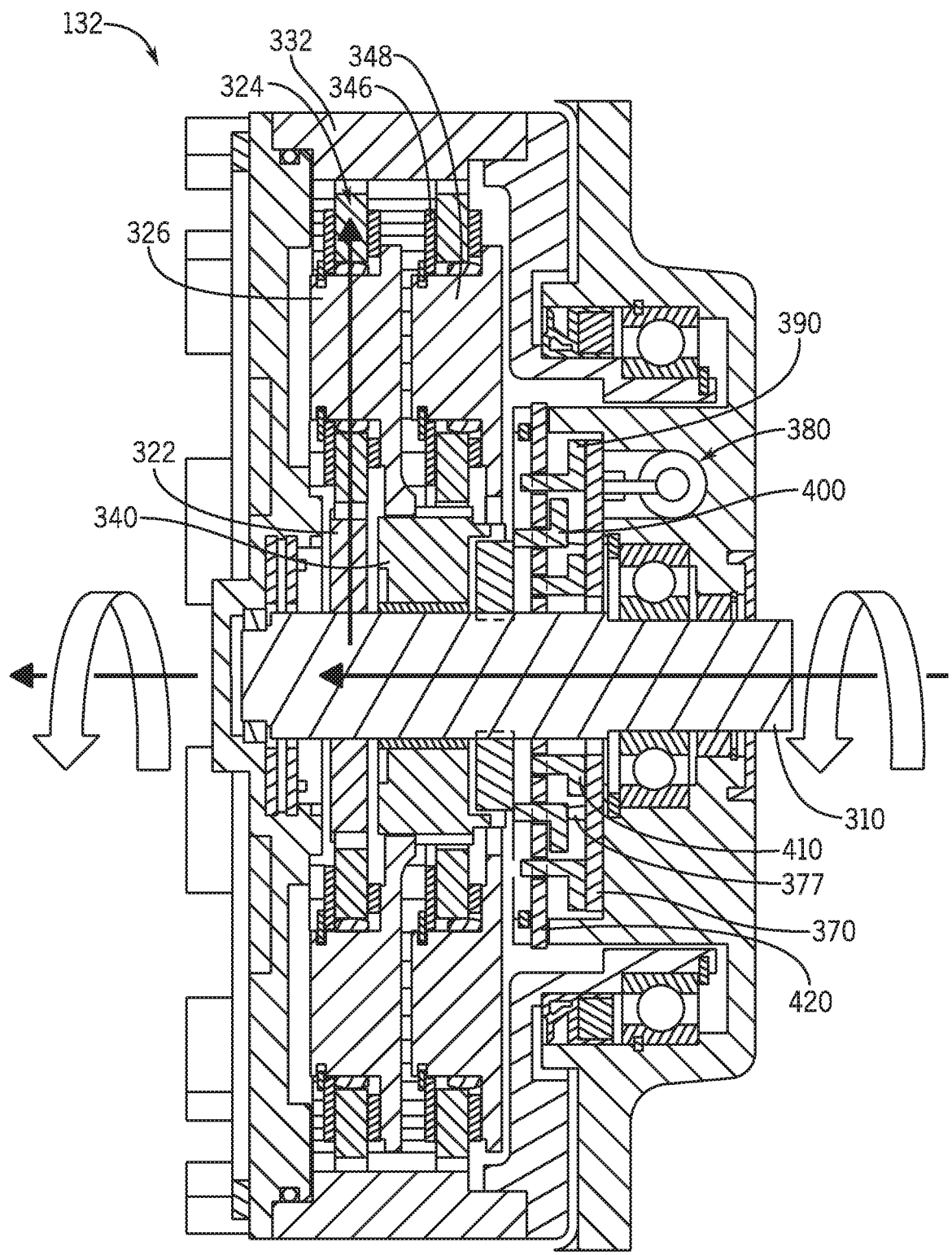
FIG. 11 is a sectional view of the power transmission assembly of FIG. 5 depicting a schematic representation of a power flow path in a second engine start mode of the example starter-generator device.

Reference is now made to FIG. 11, which is a partial cross-sectional view of the power transmission assembly 132 similar to that of FIG. 5 annotated with power flow arrows. The power flow arrows of FIG. 11 particularly depict operation of the power transmission assembly 132 in the warm engine start mode In this example, the actuator assembly 380, commanded by the controller 150, functions to pivot the cam plate 370 into a second angular position. In this position, the second cam teeth 377 of the cam plate 370 engage the second face 402 of the mid clutch 400 to place the mid clutch 400 in the engaged position. Also in the second angular position, the first cam teeth 376 of the cam plate 370 are accommodated within the openings 397 of the low clutch 390 and the third cam teeth 378 of the cam plate 370 are accommodated within the openings 417 of the high clutch 410, thereby resulting in the low clutch 390 and the high clutch 410 remaining in the disengaged positions. Since the second cam teeth 377 of the cam plate 370 engage the second face 402 of the mid clutch 400, the mid clutch 400 is pressed towards the gear set 320. As the mid clutch 400 is pressed in this direction, the clutch teeth 406 of the mid clutch 400 extend through the second slots 425 in the stator plate 420 and into the second engagement elements 432 on the second-stage sun gear 340, thereby resulting in the engaged position of the mid clutch 400. In the disengaged positions, the clutch teeth 396 of the low clutch 390 and the clutch teeth 416 of the high clutch 410 may at least partially be positioned within the slots 424, 426 of the stator plate 420, although in some embodiments, the clutch teeth 396, 416 of disengaged clutches 390, 410 may remain completely outside of the stator plate 420.

The positioning of the clutch teeth 406 of the mid clutch 400 through the stator plate 420 into the second engagement elements 432 of the second-stage sun gear 340 functions to ground and prevent rotation of the second-stage sun gear 340. In this position, the stator plate 420 functions to receive the reaction forces from the second-stage sun gear 340. Additionally, since the first-stage planet carrier 326 is splined to the second-stage sun gear 340, engagement of the mid clutch 400 also operates to ground the first-stage planet carrier 326.

In the warm engine start mode, the engine 120 may be initially inactive or active. In any event, the controller 150 energizes the electric machine 134 to operate as a motor. In particular and additionally referring to FIG. 3, the electric machine 134 rotates the pulley 220 in the first clock direction D1, thereby driving the belt 230 and pulley 210 in the first clock direction D1. The pulley 210 drives the element 135, and thus the input shaft 310, in the first clock direction D1.

Since the first-stage sun gear 322 is mounted on the input shaft 310, rotation of the input shaft 310 also rotates the first-stage sun gear 322. In turn, rotation of the first-stage sun gear 322 drives rotation of the first-stage planet gears 324. Since the first-stage planet carrier 326 and second-stage sun gear 340 are grounded, rotation of the first-stage planet gears 324 drives rotation of the ring gear 332.

Since the number of first-stage planet gears 324 in the power flow path is an odd number (e.g., 1) in the radial direction, the first-stage planet gears 324 drive the ring gear 332 in the opposite direction (e.g., the second clock direction D2) relative to the input shaft 310 and the first-stage sun gear 322 rotating in the first clock direction D1. As noted above, the ring gear 332 functions as the power transfer element 133 to interface with the crank shaft 122 of the engine 120 to drive and facilitate engine start. In effect, during the warm engine start mode, the power transmission assembly 132 operates as a sun-in, ring-out configuration, albeit at a lower gear ratio as compared to the cold engine start mode resulting from using the ratio of the second-stage planet gears 346 as opposed to the compounded ratio of the first- and second-stage planet gears 324, 346.

In one example, the power transmission assembly 132 provides a 4:1 gear ratio in the power flow direction of the warm engine start mode. In other embodiments, other gear ratios (e.g., 3:1-7:1) may be provided. Considering a 4:1 gear ratio from the power transfer belt arrangement 200, a resulting 16:1 gear ratio (e.g., approximately 12:1 to about 28:1) may be achieved for the starter-generator device 130 between the electric machine 134 and the engine 120 during the warm engine start mode. As such, if for example the electric machine 134 is rotating at 10,000 RPM, the crank shaft 122 of the engine 120 rotates at about 600-700 RPM. In one example, the torque output of the power transmission assembly 132 for the engine 120 is approximately 400-600 Nm. Accordingly, the electric machine 134 may thus have normal operating speeds with a relatively lower speed and higher torque output for engine start up or boost.

Figure 12:
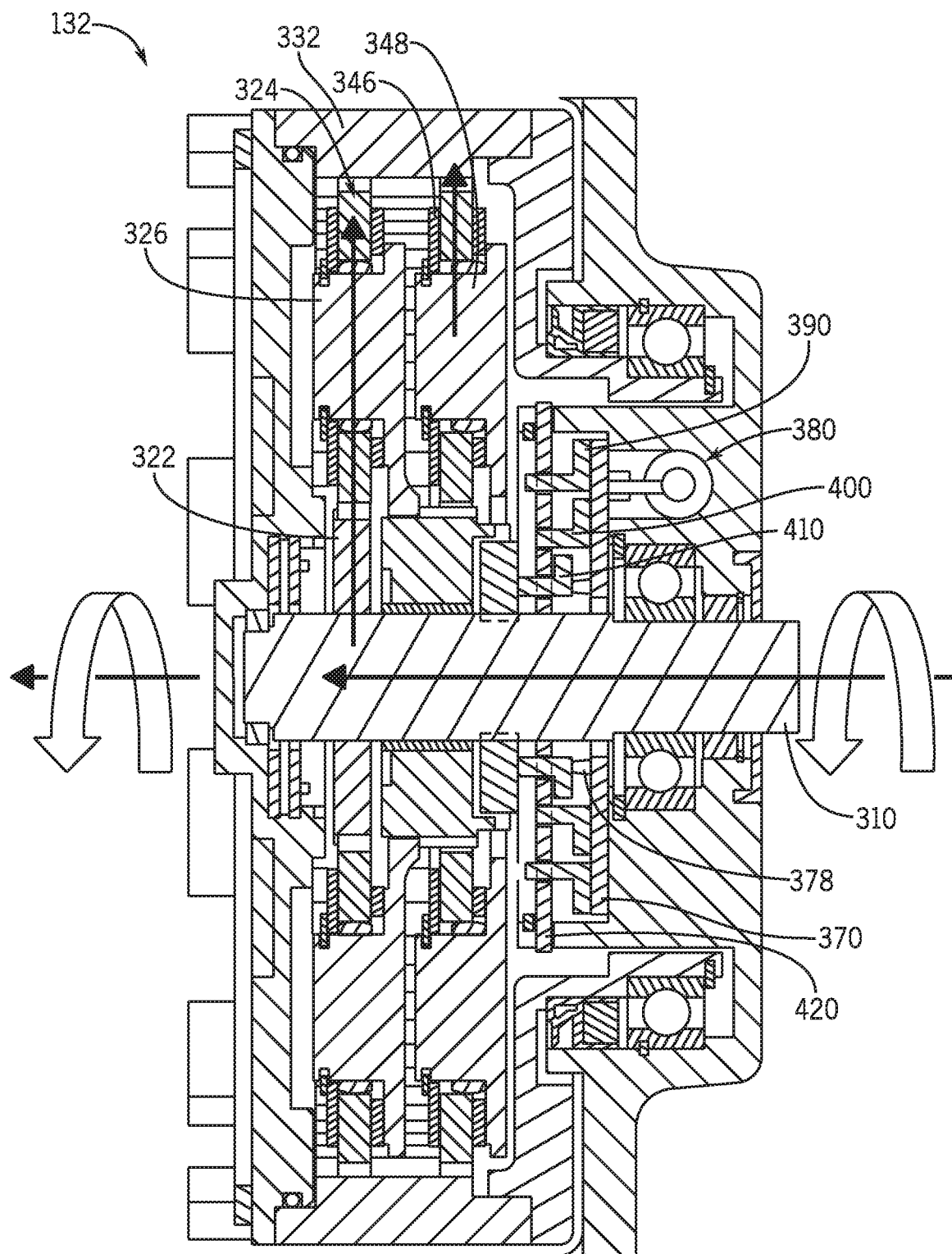
FIG. 12 is a sectional view of the power transmission assembly of FIG. 5 depicting a schematic representation of a power flow path in a boost mode of the example starter-generator device.

Reference is made to FIG. 12, which is a partial sectional cross-sectional view of the power transmission assembly 132 similar to that of FIG. 5 annotated with power flow arrows. The power flow arrows of FIG. 12 particularly depict operation of the power transmission assembly 132 in the boost mode.

In this example, the actuator assembly 380, commanded by the controller 150, functions to pivot the cam plate 370 into a third angular position. In this position, the third cam teeth 378 of the cam plate 370 engage the second face 412 of the high clutch 410 to place the high clutch 410 in the engaged position. Also in the third angular position, the first cam teeth 376 of the cam plate 370 are accommodated within the openings 397 of the low clutch 390 and the second cam teeth 377 of the cam plate 370 are accommodated within the openings 407 of the mid clutch 400, thereby resulting in the low clutch 390 and the mid clutch 400 remaining in the disengaged positions. Since the third cam teeth 378 of the cam plate 370 engage the second face 412 of the high clutch 410, the high clutch 410 is pressed towards the gear set 320. As the high clutch 410 is pressed in this direction, the clutch teeth 416 of the high clutch 410 extend through the third slots 426 in the stator plate 420 and into the third engagement elements 434, thereby resulting in the engaged position of the high clutch 410. As noted above, engagement of the third engagement elements 434 by the high clutch 410 functions to lock the second-stage sun gear 340 to the first-stage sun gear 322. In the disengaged positions, the clutch teeth 396 of the low clutch 390 and the clutch teeth 406 of the mid clutch 400 may at least partially be positioned within the slots 424, 425 of the stator plate 420, although in some embodiments, the clutch teeth 396, 406 of disengaged clutches 390, 400 may remain completely outside of the stator plate 420.

As the second-stage sun gear 340 and the first-stage sun gear 322 are locked for collective rotation, the power transmission assembly 132 may operate in the boost mode. In the boost mode, the engine 120 may be initially active and the controller 150 energizes the electric machine 134 to operate as a motor. In particular and additionally referring to FIG. 3, the electric machine 134 rotates the pulley 220 in the second clock direction D2, thereby driving the belt 230 and pulley 210 in the second clock direction D2. The pulley 210 drives the element 135, and thus the input shaft 310, in the second clock direction D2. Rotation of the input shaft 310 drives rotation of the first-stage sun gear 322, and in turn, rotation of the first-stage sun gear 322 drives rotation of the second-stage sun gear 340, thereby resulting in the first-stage sun gear 322, the second-stage sun gear 340, first-stage planet carrier 326, first-stage planet gears 324, second-stage planet carrier 348, and second-stage planet gears 346 rotating as a unit about the rotational axis 300 with the input shaft 310 to drive the ring gear 332. Since the other components of the planetary gear set 320 rotate with the input shaft 310, the ring gear 332 is driven in the same second clock direction D2. As noted above, the ring gear 332 functions as the power transfer element 133 to interface with the crank shaft 122 of the engine 120 to drive the engine 120. In effect, during the boost mode, the power transmission assembly 132 operates as a sun-in, ring-out configuration.

In one example, the power transmission assembly 132 provides a 1:1 gear ratio in the power flow direction of the boost mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the boost mode. As such, if for example the electric machine 134 is rotating at 10,000 RPM, the crank shaft 122 of the engine 120 rotates at about 2500 RPM. Accordingly, the electric machine 134 may thus have normal operating speeds while providing an appropriate boost speed to the engine 120.

Figure 13:
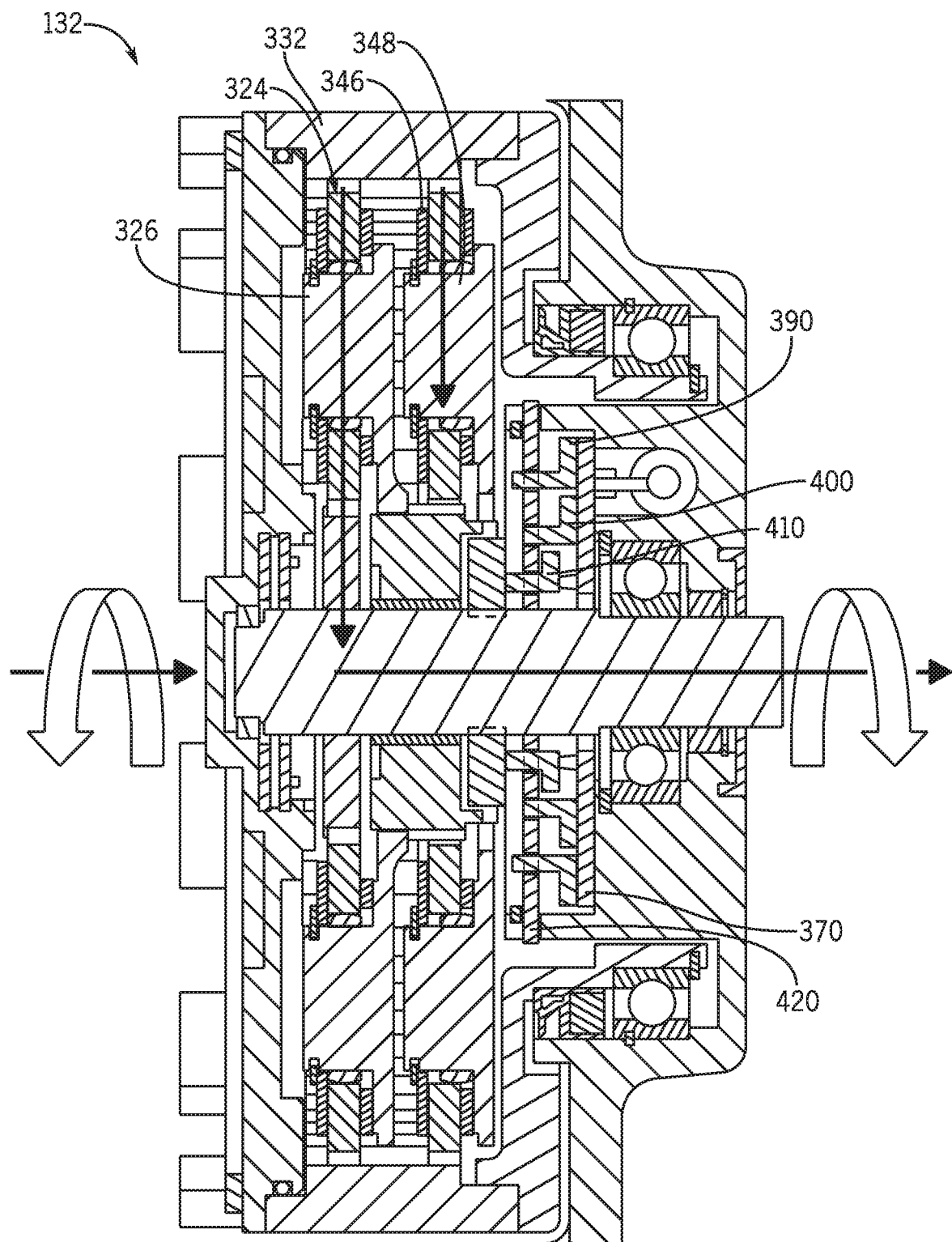
FIG. 13 is a sectional view of the power transmission assembly of FIG. 5 depicting a schematic representation of a power transfer path in a generation mode of the example starter-generator device.

Reference is made to FIG. 13, which is a cross-sectional view of the power transmission assembly 132 similar to that of FIG. 5 annotated with power flow arrows. The power flow arrows of FIG. 13 particularly depict operation of the power transmission assembly 132 in the generation mode In this example, the actuator assembly 380, commanded by the controller 150, functions to pivot the cam plate 370 into the third angular position. As noted above, in this position, the third cam teeth 378 of the cam plate 370 engage the second face 412 of the high clutch 410, such that the high clutch 410 is engaged and the low and mid clutches 390, 400 are disengaged. As the high clutch 410 is engaged, the clutch teeth 416 of the high clutch 410 extend through the third slots 426 in the stator plate 420 and into the third engagement elements 434, and the third engagement elements 434 function to lock the second-stage sun gear 340 to the first-stage sun gear 322.

As the second-stage sun gear 340 and the first-stage sun gear 322 are locked for collective rotation, the power transmission assembly 132 may operate in the generation mode. Subsequent to the engine start modes and/or the boost mode, the engine 120 begins to accelerate above rotational speed provided by power transmission assembly 132, and the electric machine 134 is commanded to decelerate and to cease providing torque to power transmission assembly 132. After the engine 120 has stabilized to a sufficient speed and the electric machine 134 has sufficiently decelerated or stopped, the high clutch 410 is engaged as described above to operate the power transmission assembly 132 in the generation mode.

In the generation mode, the engine 120 rotates the crank shaft 122 and power transfer element 133 that is engaged with the ring gear 332, thus driving the ring gear 332 in the second clock direction D2. The ring gear 332 drives the first-stage planet gears 324 and the second-stage planet gears 346, which respectively drive the first-stage sun gear 322 and the second-stage sun gear 340.

Since the first-stage sun gear 322 is engaged to the second-stage sun gear 340, the rotations of the first-stage and second-stage sun gears 322, 340 are transferred to the input shaft 310. Therefore, as the ring gear 332 rotates in the second clock direction D2, the input shaft 310 is driven and similarly rotates in the second clock direction D2 at the same rate of rotation. As noted above, the input shaft 310 is connected with and provides output power to the electric machine 134 in the second clock direction D2 via the power transfer belt arrangement 200. In effect, during the generation mode, the power transmission assembly 132 operates as a ring-in, sun-out configuration In one example, the power transmission assembly 132 provides a 1:1 gear ratio in the power flow direction of the generation mode. In other embodiments, other gear ratios may be provided. Considering a 4:1 gear ratio from the power transfer belt arrangement 200, a resulting 4:1 gear ratio may be achieved for the starter-generator device 130 between the electric machine 134 and the engine 120 during the generation mode. As a result, the electric machine 134 may thus have normal operating speeds in both power flow directions with relatively low torque output during power generation.

Figure 15:
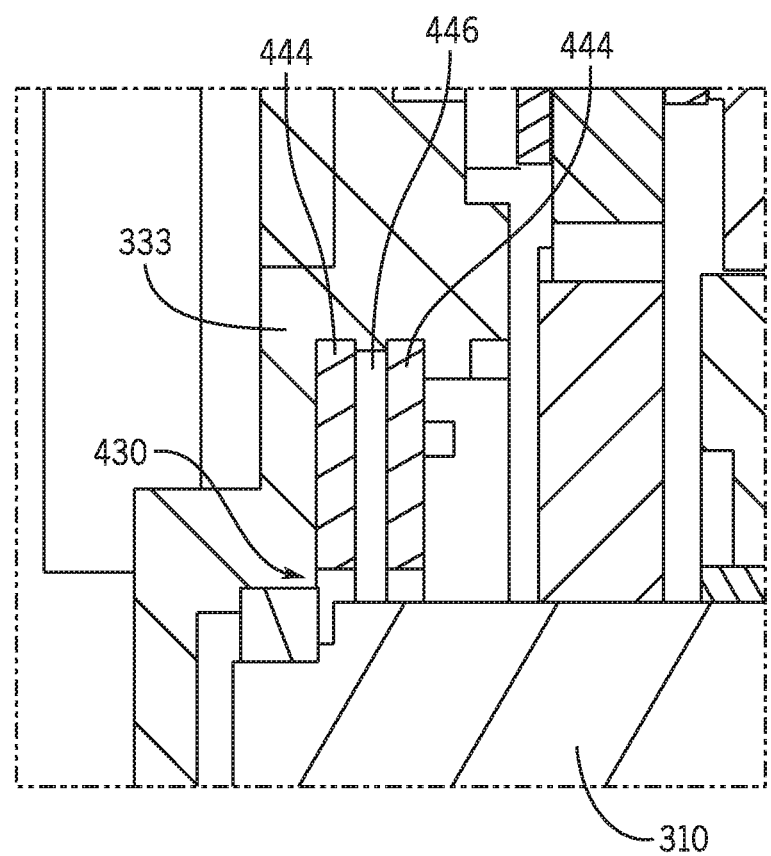
FIG. 15 is a more detailed, partial view of a portion of the power transmission assembly of FIG. 5 depicting a drag clutch of the example starter-generator device.

As will now be described, the power transmission assembly 132 may further be configured to facilitate transitions between the modes, particularly by slowing down the electric machine 134. Reference is now made to FIG. 15, which is a closer, more detailed view of a portion of FIG. 5 according to one example. The view in FIG. 15 particularly depicts a drag or synchronizing clutch 440. As shown, the drag clutch 440 is positioned in between the input shaft 310 and the ring gear cover 333 mounted to the ring gear 332. In particular, the drag clutch 440 includes a shift plate 446 mounted on the input shaft 310 that rotates with the input shaft 310. The drag clutch 440 further includes one or more cover plates 444, parallel to one another, that are mounted on the ring gear cover 333. In this example, the shaft plate 446 is mounted in between the cover plates 444. A spring (schematically shown) 448 may be provided to urge the cover plates 444 and the shaft plate 446 together such that the plates 444, 446 have a frictional engagement. This frictional engagement creates a drag force between the input shaft 310 and the ring gear 332 (and thus, (and thus, between the electric machine 132 and the engine 120).

Since the electric machine 132 is typically moving at a higher speed than the engine 120, the drag clutch 440 generally operates to reduce the speed of the electric machine 132 relative to the engine 120 to enable synchronization. This facilitates the transitions between the modes, particularly between the cold engine start mode and the warm engine start mode, between the warm engine start mode and the boost mode, and between the boost mode and generation mode.

The frictional engagement between the plates 444, 446 of the drag clutch 440 (particularly, the force of the spring 448) may be preset or "preloaded" with a designated amount of force, as necessary or desired to provide the appropriate amount of drag. An example drag force may be, for example, 10 Nm, although other drag force amounts may be provided. In one embodiment, the engagement of the clutches 390, 400, 410 with the gear set 320 may result in the gear set 320 pressing against the drag clutch 440, thereby increasing the drag force to further decrease motor speed and facilitating faster transitions.

Thus, various embodiments of the vehicle electric system have been described that include an integrated starter-generator device. Various transmission assemblies may be included in the device, thus reducing the space occupied by the system. The transmission assembly may provide multiple speeds or gear ratios and transition between speeds/gear ratios. One or more clutch arrangements may be used to selectively apply torque to the gear set of the transmission assembly in both power flow directions. Direct mechanical engagement with the engine shaft reduces the complexity and improves reliability of the system. Using planetary gear sets in the transmission assembly provides high gear reduction and torque capabilities with reduced backlash in a compact space envelope. As a result of the bi-directional nature of the power transmission assembly, the power transfer belt arrangement may be implemented with only a single belt tensioner, thereby providing a relatively compact and simple assembly. Additionally, by using the power transfer belt arrangement with belt and pullies to couple together and transfer power between the electric machine and the power transmission assembly, instead of directly connecting and coupling the electric machine to the power transmission assembly, the electric machine may be mounted apart from the transmission assembly to better fit the engine in a vehicle engine bay. Additionally, by using the belt and pullies to couple the electric machine to the power transmission assembly, an additional gear ratio (e.g., a 4:1 ratio) may be achieved. Embodiments discussed above include a double planetary gear set, sun in, ring out configuration to provide warm and cold engine start modes and a ring in, sun out configuration to provide a generation mode. As such, a four mode assembly may be provided.

As noted above, the dog clutch arrangement provides clutches with some amount of flexibility to modify the power flow paths in a relatively compact and robust assembly. The cam arrangement cooperates with the dog clutch arrangement to reposition the clutches from disengaged positions to engaged positions based on the angular position in a reliable and relatively simple manner. In some examples, the combination starter-generator clutch may further include a drag clutch that functions to facilitate synchronization during speed or direction changes.

Also, the following examples are provided, which are numbered for easier reference.

1. A combination starter-generator device for a work vehicle having an engine, the starter-generator device comprising: an electric machine; a gear set configured to receive rotational input from the electric machine and from the engine and to couple the electric machine and the engine in a first power flow direction and a second power flow direction, the gear set configured to operate in one of multiple gear ratios in the first power flow direction and at least one gear ratio in the second power flow direction; and a clutch arrangement with at least one active clutch selectively coupled to the gear set to effect the gear ratios in the first power flow direction and in the second power flow direction, wherein the clutch arrangement further includes at least one drag clutch to apply a drag force on the gear set to slow the electric machine.

2. The combination starter-generator device of example 1, wherein the gear set includes an input shaft that receives the rotational input from the electric machine in the first power flow direction, and wherein the at least one drag clutch includes a first drag clutch portion mounted on the input shaft.

3. The combination starter-generator device of example 2, wherein the gear set includes an output element rotating with the engine, and wherein the at least one drag clutch includes a second drag clutch portion mounted for rotation with the output element.

4. The combination starter-generator device of example 3, wherein the gear set includes a ring gear as the output element and a ring gear cover mounted within the ring gear to at least partially enclose the gear set and rotating with the ring gear, the second drag clutch portion being mounted on the ring gear cover.

5. The combination starter-generator device of example 4, wherein the first drag clutch portion includes a flange mounted to the input shaft and a shaft plate extending from the flange.

6. The combination starter-generator device of example 5, wherein the second drag clutch portion includes at least one cover plate extending from the ring gear cover, the shaft plate frictionally engaging the at least one cover plate to apply the drag force.

7. The combination starter-generator device of example 6, wherein the drag force is approximately 10 Nm.

8. The combination starter-generator device of example 7, wherein the at least one drag clutch is spring loaded to passively apply the drag force on the input shaft.

9. The combination starter-generator device of example 6, wherein the gear set is configured to operate in one of at least a first gear ratio, a second gear ratio, and a third gear ratio in the first power flow direction and at least a fourth gear ratio in the second power flow direction, and wherein the at least one drag clutch is configured to slow the electric machine during transitions between the first, second, and third gear ratios and between the first power flow direction and the second power flow direction.

10. The combination starter-generator device of example 9, wherein the clutch arrangement is a dog clutch arrangement selectively coupled to the gear set to effect the first, second, and third gear ratios in the first power flow direction and the fourth gear ratio in the second power flow direction, and wherein the combination starter-generator device further comprises a cam plate configured to shift the at least one active clutch from a disengaged position in which the at least one active clutch is decoupled from the gear set into an engaged position in which the at least one active clutch is coupled to the gear set.

11. The combination starter-generator device of example 10, wherein the at least one active clutch includes at least a first clutch, a second clutch, and a third clutch, each selectively repositionable between the engaged position and the disengaged position, wherein the first, second, and third clutches are ring-shaped with the second clutch concentrically arranged within the first clutch when both of the first and second clutches are in the disengaged positions and the third clutch concentrically arranged within the second clutch when both of the second and third clutches are in the disengaged positions, and wherein the cam plate is generally disc-shaped with a first face and a second face, the cam plate including a plurality of cam teeth extending from the first face to engage with and shift the first, second, and third clutches from the disengaged positions to the engaged positions.

12. The combination starter-generator device of example 11, wherein the cam plate is configured to be pivoted through a range of angular positions, wherein, at a first angular position, the at least one first cam tooth engages the first clutch and the second and third clutches remain disengaged relative to the at least one second cam tooth and the at least one third cam tooth, wherein at a second angular position, the at least one second cam tooth engages the second clutch and the first and third clutches remain disengaged relative to the at least one first cam tooth and the at least one third cam tooth, and wherein, at a third angular position, the at least one third cam tooth engages the third clutch and the first and second clutches remain disengaged relative to the at least one first cam tooth and the at least one second cam tooth.

13. The combination starter-generator device of example 12, wherein the at least one first cam tooth is radially and circumferentially offset relative to the at least one second cam tooth, and wherein the at least one second cam tooth is radially and circumferentially offset relative to the at least one third cam tooth.

14. The combination starter-generator device of example 13, wherein the first clutch includes a first ring base and at least one first clutch tooth extending from the first ring base, the second clutch includes a second ring base and at least one second clutch tooth extending from the second ring base, and the third clutch includes a third ring base and at least one third clutch tooth extending from the third ring base, and wherein, in the respective engaged positions of the first, second, and third clutches, the at least one first tooth, the at least one second tooth, and the at least one third tooth are engaged with the gear set.

15. The combination starter-generator device of example 14, wherein the gear set includes a compound epicyclic gear train including an input shaft, first-stage and second-stage sun gears, first-stage and second-stage planet gears, first-stage and second-stage carriers, and a ring gear with the first-stage planet carrier splined to the second-stage sun gear, and wherein the first-stage planet gears have a different gear tooth count than the second-stage planet gears; wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio; and wherein, in a warm engine start mode, the second clutch is in the engaged position to ground the second-stage sun gear and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A combination starter-generator device for a work vehicle having an engine, the starter-generator device comprising:
an electric machine;
a gear set configured to receive rotational input from the electric machine and from the engine and to couple the electric machine and the engine in a first power flow direction and a second power flow direction, the gear set configured to operate in one of multiple gear ratios in the first power flow direction and at least one gear ratio in the second power flow direction; and
a clutch arrangement with at least one active clutch selectively coupled to the gear set to effect the gear ratios in the first power flow direction and in the second power flow direction,
wherein the clutch arrangement further includes at least one drag clutch to apply a drag force on the gear set to slow the electric machine.

2. The combination starter-generator device of claim 1, wherein the gear set includes an input shaft that receives the rotational input from the electric machine in the first power flow direction, and wherein the at least one drag clutch includes a first drag clutch portion mounted on the input shaft.

3. The combination starter-generator device of claim 2, wherein the gear set includes an output element rotating with the engine, and
wherein the at least one drag clutch includes a second drag clutch portion mounted for rotation with the output element.

4. The combination starter-generator device of claim 3, wherein the gear set includes a ring gear as the output element and a ring gear cover mounted within the ring gear to at least partially enclose the gear set and rotating with the ring gear, the second drag clutch portion being mounted on the ring gear cover.

5. The combination starter-generator device of claim 4, wherein the first drag clutch portion includes a flange mounted to the input shaft and a shaft plate extending from the flange.

6. The combination starter-generator device of claim 5, wherein the second drag clutch portion includes at least one cover plate extending from the ring gear cover, the shaft plate frictionally engaging the at least one cover plate to apply the drag force.

7. The combination starter-generator device of claim 6, wherein the drag force is approximately 10 Nm.

8. The combination starter-generator device of claim 7, wherein the at least one drag clutch is spring loaded to passively apply the drag force on the input shaft.

9. The combination starter-generator device of claim 6, wherein the gear set is configured to operate in one of at least a first gear ratio, a second gear ratio, and a third gear ratio in the first power flow direction and at least a fourth gear ratio in the second power flow direction, and
wherein the at least one drag clutch is configured to slow the electric machine during transitions between the first, second, and third gear ratios and between the first power flow direction and the second power flow direction.

10. The combination starter-generator device of claim 9, wherein the clutch arrangement is a dog clutch arrangement selectively coupled to the gear set to effect the first, second, and third gear ratios in the first power flow direction and the fourth gear ratio in the second power flow direction, and
wherein the combination starter-generator device further comprises a cam plate configured to shift the at least one active clutch from a disengaged position in which the at least one active clutch is decoupled from the gear set into an engaged position in which the at least one active clutch is coupled to the gear set.

11. The combination starter-generator device of claim 10, wherein the at least one active clutch includes at least a first clutch, a second clutch, and a third clutch, each selectively repositionable between the engaged position and the disengaged position,
wherein the first, second, and third clutches are ring-shaped with the second clutch concentrically arranged within the first clutch when both of the first and second clutches are in the disengaged positions and the third clutch concentrically arranged within the second clutch when both of the second and third clutches are in the disengaged positions, and
wherein the cam plate is generally disc-shaped with a first face and a second face, the cam plate including a plurality of cam teeth extending from the first face to engage with and shift the first, second, and third clutches from the disengaged positions to the engaged positions.

12. The combination starter-generator device of claim 11, wherein the cam plate is configured to be pivoted through a range of angular positions, wherein, at a first angular position, the at least one first cam tooth engages the first clutch and the second and third clutches remain disengaged relative to the at least one second cam tooth and the at least one third cam tooth, wherein at a second angular position, the at least one second cam tooth engages the second clutch and the first and third clutches remain disengaged relative to the at least one first cam tooth and the at least one third cam tooth, and wherein, at a third angular position, the at least one third cam tooth engages the third clutch and the first and second clutches remain disengaged relative to the at least one first cam tooth and the at least one second cam tooth.

13. The combination starter-generator device of claim 12, wherein the at least one first cam tooth is radially and circumferentially offset relative to the at least one second cam tooth, and wherein the at least one second cam tooth is radially and circumferentially offset relative to the at least one third cam tooth.

14. The combination starter-generator device of claim 13, wherein the first clutch includes a first ring base and at least one first clutch tooth extending from the first ring base, the second clutch includes a second ring base and at least one second clutch tooth extending from the second ring base, and the third clutch includes a third ring base and at least one third clutch tooth extending from the third ring base, and
wherein, in the respective engaged positions of the first, second, and third clutches, the at least one first tooth, the at least one second tooth, and the at least one third tooth are engaged with the gear set.

15. The combination starter-generator device of claim 14,
wherein the gear set includes a compound epicyclic gear train including an input shaft, first-stage and second-stage sun gears, first-stage and second-stage planet gears, first-stage and second-stage carriers, and a ring gear with the first-stage planet carrier splined to the second-stage sun gear, and wherein the first-stage planet gears have a different gear tooth count than the second-stage planet gears;

wherein, in a cold engine start mode, the first clutch is in the engaged position to ground the second-stage planet carrier and the second and third clutches are in the disengaged positions, and further, rotational power from the electric machine moves in the first power flow direction from the input shaft, to the first-stage sun gear, to the first stage-planet gears, to the first-stage planet carrier, to the second-stage sun gear, to the second-stage planet gears, and to the ring gear out to the engine at the first gear ratio; and wherein, in a warm engine start mode, the second clutch is in the engaged position to ground the second-stage sun gear and the first and third clutches are in the disengaged positions, and further, the rotational power from the electric machine moves in the first power flow direction from the input shaft, to the first-stage sun gear, to the first stage-planet gears, and to the ring gear out to the engine at the second gear ratio.

16. The combination starter-generator device of claim 15,
wherein, in a boost mode, the third clutch is in the engaged position to couple the second-stage sun gear to the first-stage sun gear and the first and second clutches are in the disengaged positions, and further, the rotational power from the electric machine moves in the first power flow direction from the input shaft, to the first-stage and second-stage sun gears, to the first-stage and second-stage planet gears, and to the ring gear out to the engine at the third gear ratio; and wherein, in a generation mode, the third clutch is in the engaged position to couple the second-stage sun gear to the first-stage sun gear and the first and second clutches are in the disengaged positions, and further, rotational power from the engine moves in the second power flow direction from the ring gear, to the first-stage and second-stage planet gears, to the first-stage and second-stage sun gears, and to the input shaft out to the electric machine at the fourth gear ratio.

17. The combination starter-generator device of claim 16, wherein each of the third gear ratio and the fourth gear ratio is a 1:1 ratio through the gear set, and wherein the first gear ratio is greater than the second gear ratio, and the second gear ratio is greater than the third gear ratio.

18. A drivetrain assembly for a work vehicle, comprising:
an engine;
an electric machine;
a gear set configured to receive rotational input from the electric machine and from the engine and to couple the electric machine and the engine in a first power flow direction and a second power flow direction, the gear set configured to operate in one of at least a first gear ratio, a second gear ratio, or a third gear ratio in the first power flow direction and at least the third gear ratio in the second power flow direction;
a clutch arrangement with at least one active clutch selectively coupled to the gear set to effect the first, second, and third gear ratios in the first power flow direction and the third gear ratio in the second power flow direction, wherein the clutch arrangement further includes at least one drag clutch to apply a drag force on the gear set to slow the electric machine; and
a cam plate configured to shift the at least one active clutch from a disengaged position in which the at least one active clutch is decoupled from the gear set into an engaged position in which the at least one active clutch is coupled to the gear set.

19. The drivetrain assembly of claim 18,
wherein the gear set includes an input shaft that receives the rotational input from the electric machine in the first power flow direction and an output element rotating with the engine, and
wherein the at least one drag clutch includes a first portion mounted on the input shaft and a second portion mounted for rotation with the output element that frictionally engage one another to apply the drag force.

20. The drivetrain assembly of claim 19, wherein the drag force is approximately 10 Nm.

* * * * *